(12) United States Patent
Breeden, III et al.

(10) Patent No.: US 9,856,075 B2
(45) Date of Patent: Jan. 2, 2018

(54) REUSABLE TIE DOWN STORAGE CASE

(71) Applicant: WINSTON PRODUCTS, LLC, Cleveland, OH (US)

(72) Inventors: Winston H. Breeden, III, Chagrin Falls, OH (US); Curtis P. Taylor, Chagrin Falls, OH (US); Matthew G. Hanson, Chagrin Falls, OH (US); Ryan Chepla, Orange Village, OH (US); Colleen Kurniawan, Cleveland, OH (US); David Drabousky, Twinsburg, OH (US)

(73) Assignee: Winston Products, LLC, Cleveland, OH (US)

( * ) Notice: Subject to any disclaimer, the term of this patent is extended or adjusted under 35 U.S.C. 154(b) by 0 days.

(21) Appl. No.: 15/181,217

(22) Filed: Jun. 13, 2016

(65) Prior Publication Data
US 2016/0376092 A1 Dec. 29, 2016

Related U.S. Application Data

(60) Provisional application No. 62/174,869, filed on Jun. 12, 2015, provisional application No. 62/220,614, filed on Sep. 18, 2015.

(51) Int. Cl.
*B65D 85/62* (2006.01)
*B60P 7/08* (2006.01)
(Continued)

(52) U.S. Cl.
CPC ............ *B65D 85/62* (2013.01); *B60P 7/0846* (2013.01); *B65D 25/106* (2013.01); *B65D 25/2826* (2013.01); *B60P 7/0823* (2013.01)

(58) Field of Classification Search
CPC ......... B60P 7/0823; B60P 7/0846; B60P 7/08; B65D 25/10; B65D 25/106; B65D 25/28;
(Continued)

(56) References Cited

U.S. PATENT DOCUMENTS 1,933,894 A * 11/1933 Clink ...................... B25H 3/02
220/524
7,131,608 B2 11/2006 Breeden, III et al.
(Continued)

FOREIGN PATENT DOCUMENTS

WO 2015027182 2/2015

OTHER PUBLICATIONS

PCT/US2016/037255—International Search Report and the Written Opinion of the International Searching Authority dated Aug. 23, 2016.

*Primary Examiner* — Bryon Gehman
(74) *Attorney, Agent, or Firm* — Tucker Ellis LLP; Patrick F. Clunk

(57) ABSTRACT

Provided is a reusable tie down storage case including a housing having a tie down storage area and first and second strap storage areas, at least one tab in the tie down area for engaging a tie down, a first movable flap covering the first strap storage area to prevent removal of a first strap, and a second movable flap covering the second strap storage area to prevent removal of the second strap. The reusable case can be used as a retail package and as a reusable case after purchase to hold the tie downs in the case without an additional fastener.

20 Claims, 27 Drawing Sheets

(51) Int. Cl.
*B65D 25/10* (2006.01)
*B65D 25/28* (2006.01)

(58) Field of Classification Search
CPC ............... B65D 25/2826; B65D 73/00; B65D 73/0014; B65D 85/00; B65D 85/62; B65D 85/70; B65D 85/672
USPC ................................................ 206/338–345
See application file for complete search history.

(56) References Cited

U.S. PATENT DOCUMENTS

| | | | | |
|---|---|---|---|---|
| 8,074,795 | B2 * | 12/2011 | Neu | B65D 25/10 206/279 |
| 2005/0145747 | A1 | 7/2005 | Breeden, III et al. | |
| 2016/0207681 | A1 * | 7/2016 | Deshpande | B65D 25/10 |

* cited by examiner

REUSABLE TIE DOWN STORAGE CASE

RELATED APPLICATIONS

This application claims the benefit of U.S. Provisional Application No. 62/174,869 filed Jun. 12, 2015 and U.S. Provisional Application No. 62/220,614 filed Sep. 18, 2015, which are hereby incorporated herein by reference.

FIELD OF INVENTION

The present invention relates generally to a storage case, and more particularly to reusable storage case for tie downs.

BACKGROUND

Items such as tie down assemblies are commonly used to secure snowmobiles, ATVs, etc. in a vehicle, trailer, etc. A tie down assembly includes a ratchet assembly and straps. When the tie down assembly is displayed at retail, it is typically neatly packaged, but the packaging is thrown away once it is opened. When the tie down assembly is thereafter not in use, the straps are loose and unwound. If several tie down assemblies are being used, they can be messy and can get dirty or tangled in, for example, the bed of a pickup truck.

SUMMARY OF INVENTION

The present application provides a reusable tie down storage case including a housing having a tie down storage area and first and second strap storage areas, at least one tab in the tie down area for engaging a tie down assembly, a first movable flap covering the first strap storage area to prevent removal of a first strap, and a second movable flap covering the second strap storage area to prevent removal of the second strap. The reusable case can be used as a retail package and as a reusable case after purchase to hold the tie down assemblies in the case without an additional fastener.

According to an aspect, a reusable tie down storage case is provided that includes a housing having a bottom portion, and side walls and end walls projecting from the bottom portion to define a cavity, the cavity having a first space for receiving one or more tie downs and a second space for receiving one or more straps of the tie downs, at least one deflectable tab in the first space, the tab having a catch for engaging one of the one or more tie downs, and a flap connected to one of the end walls and movable between a first position to close the second space and a second position to allow access to the second space.

According to another aspect, a reusable tie down assembly is provided that includes a tie down having first and second straps, and a reusable tie down storage case including a housing having a bottom portion, and side walls and end walls projecting from the bottom portion to define a cavity, the cavity having a first space for receiving the tie down, a second space for receiving the first strap, and a third space for receiving the second strap, a deflectable tab projecting from the bottom portion in the first space, the tab having a catch for engaging the tie down to secure the tie down in the storage case, a first flap connected to one of the end walls and movable between a first position to close the second space and a second position to allow access to the second space, and a second flap connected to the other of the end walls and movable between a first position to close the third space and a second position to allow access to the third space.

According to still another aspect a reusable tie down storage case is provided that includes a housing having a tie down storage area and first and second strap storage areas, at least one tab in the tie down storage area for engaging a tie down, a first movable flap covering the first strap storage area to prevent removal of a first strap, and a second movable flap covering the second strap storage area to prevent removal of the second strap.

The foregoing and other features of the application are described below with reference to the drawings.

DETAILED DESCRIPTION

Figure 1:
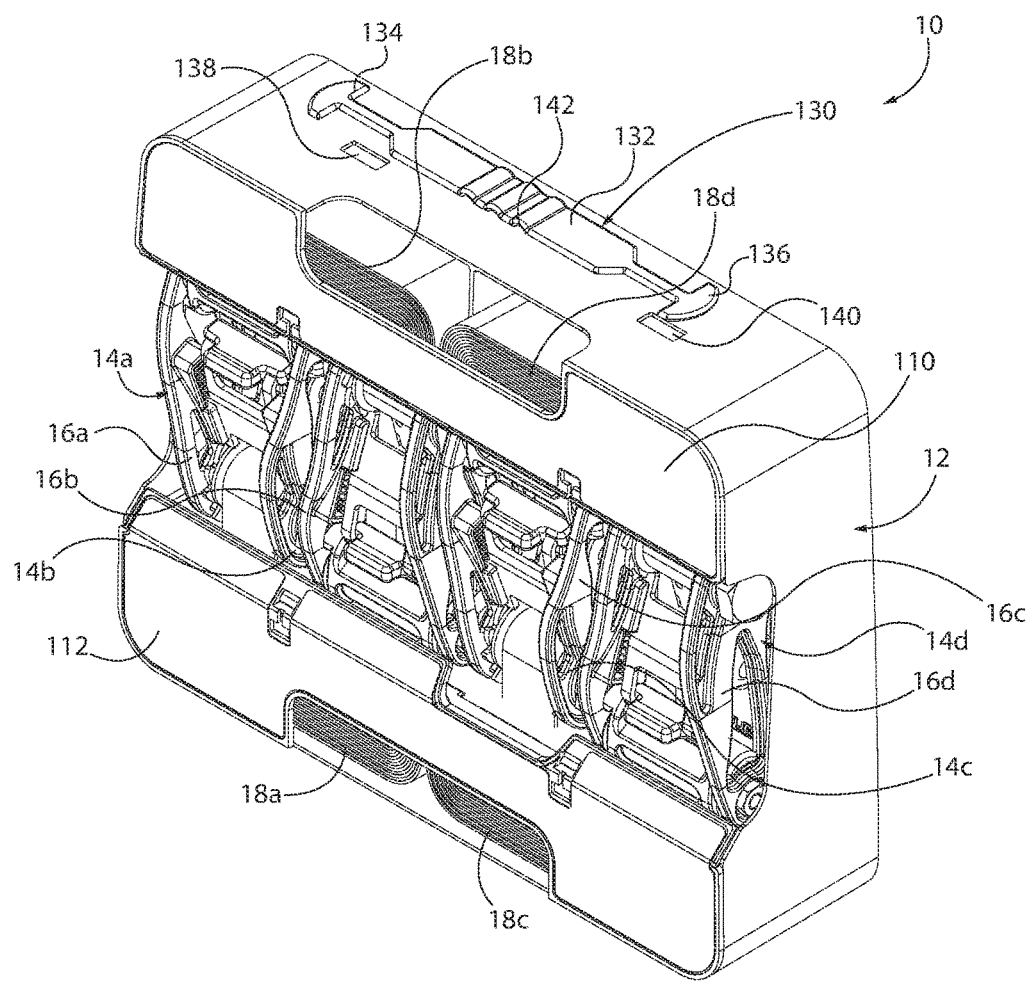
FIG. 1 is a perspective view of an exemplary reusable tie down storage case in a closed position with tie down assemblies.

The principles of the present application relate to a retail package or case for the display and storage of tie downs and their associated straps and for storing the tie downs and associated straps during use, and thus will be described below in this context. It will be appreciated that the principles of the application may be applicable to the storage and display of other products, such as cambuckles, bungees, etc.

Turning now to FIGS. 1-11, a reusable tie down storage case is shown generally at reference numeral 10. The storage case includes a housing 12 for storing and displaying a plurality of tie down assemblies 14a-14d. Each tie down assembly includes a ratchet 16a-16d having a first strap 18a-18d with a hook 20a-20d and a second strap 22a-22d with a hook 24a-24d. The housing 12 has a first space 30 or tie down storage area for receiving the ratchets 16a-16d, a second space 32 or first strap storage area for receiving straps 22a, 22c, 18b, and 18d, and a third space 34 or second strap storage area for receiving straps 18a, 18c, 22b, and 22d. The second space 32 is provided above the first space 30 and the third space 34 is provided below the first space 30. The ratchets 16a-16d are oppositely oriented in the first space 30, for example to reduce the footprint of the case, such that a handle of the ratchets 16a and 16c is adjacent the second space 32 and the handle of the ratchets 16b and 16d is adjacent the third space 34. By providing the first, second, and third spaces 30, 32, and 34, the straps 18a-18d, which are the adjustable longer straps of the tie down assemblies 14a-14d, can be pre-threaded into the ratchets, respectively. It will be appreciated that straps can be provided that are not pre-threaded.

Figure 2:
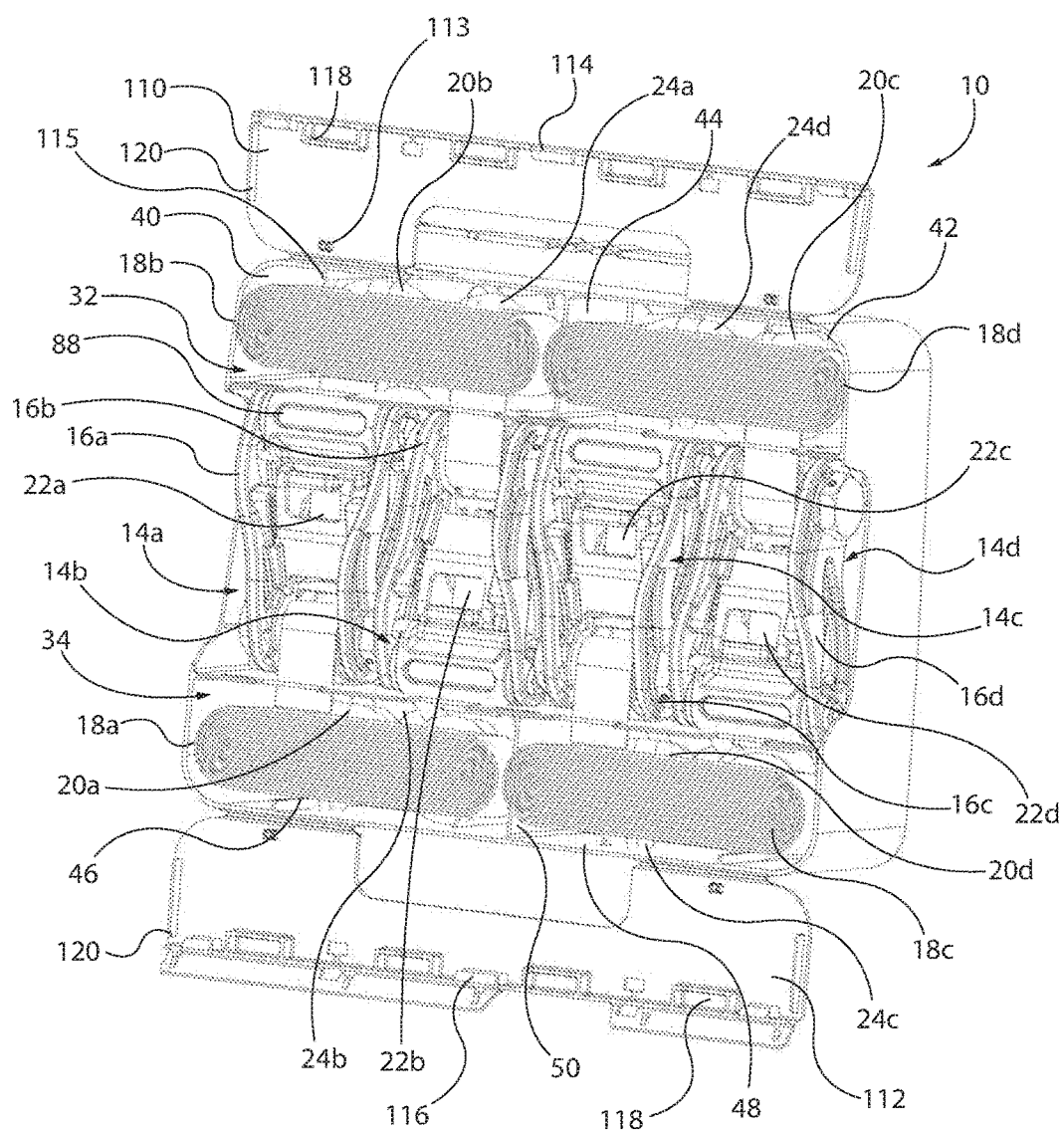
FIG. 2 is a perspective view of the reusable tie down storage case in an open position with tie down assemblies.
Figure 3:
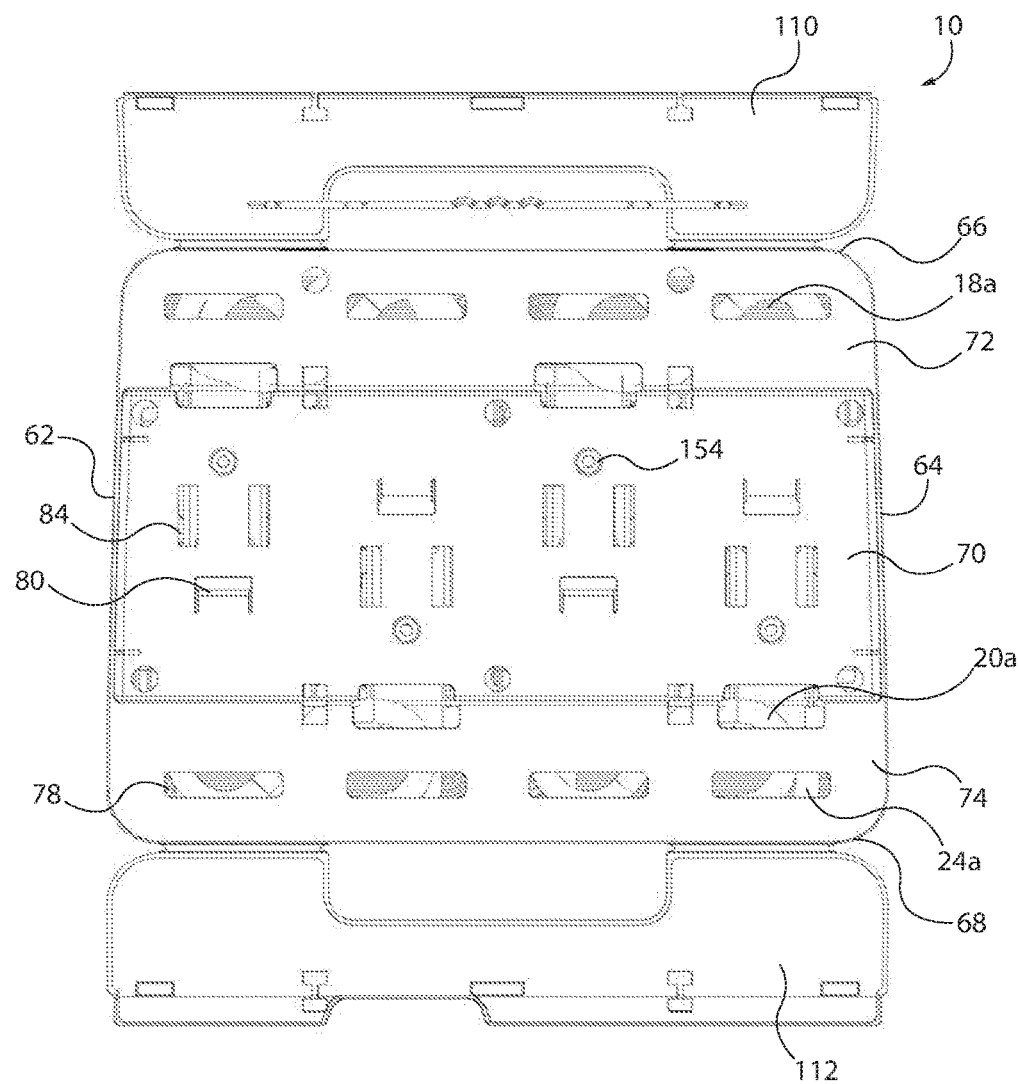
FIG. 3 is a back view of the reusable tie down storage case in the open position with tie down assemblies.
Figure 4:
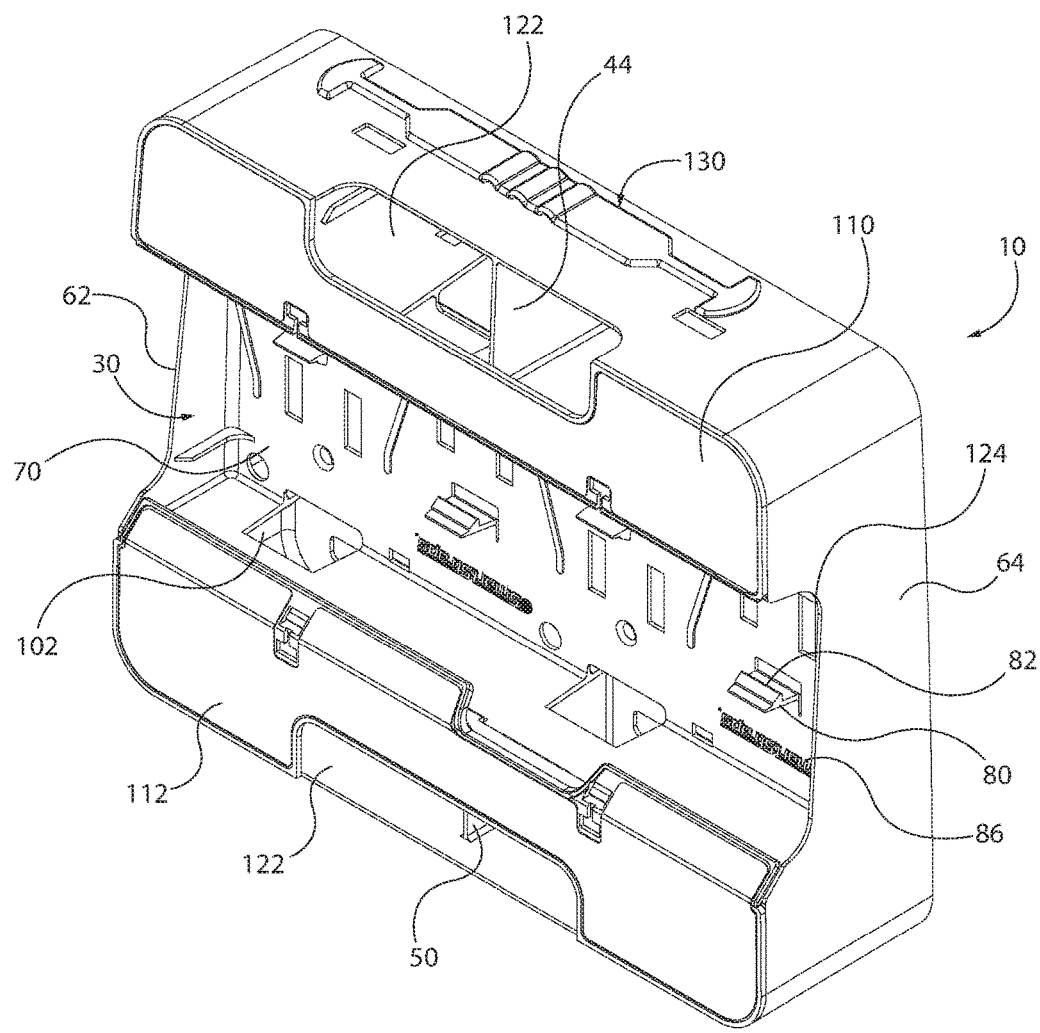
FIG. 4 is a perspective view of the reusable tie down storage case in the closed position without tie down assemblies.
Figure 5:
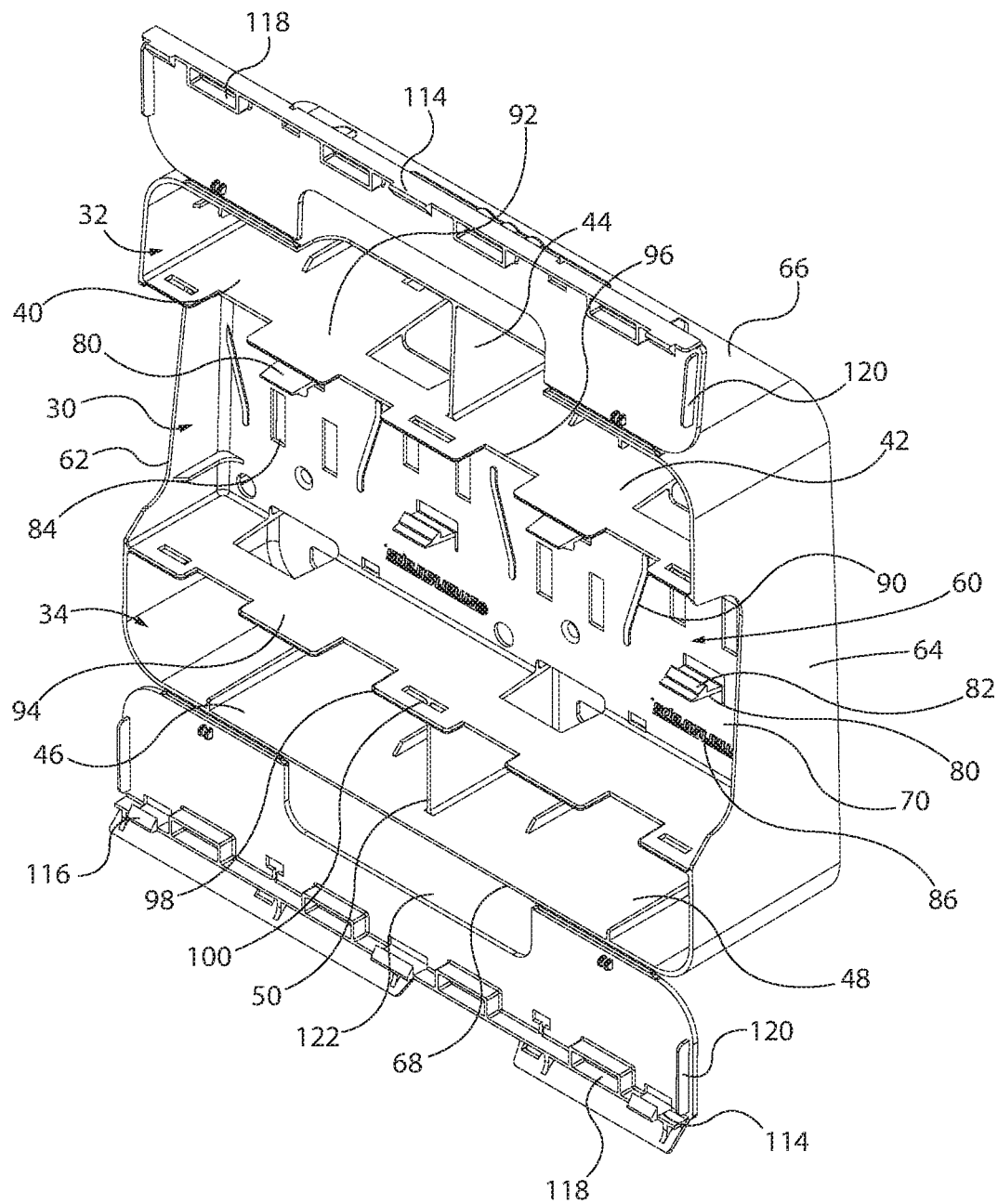
FIG. 5 is a perspective view of the reusable tie down storage case in the open position without tie down assemblies.

As shown in FIG. 2, the second space 32 is divided into first and second compartments 40 and 42 divided by a wall 44, and the third space 34 is divided into third and fourth compartments 46 and 48 divided by a wall 50. The first compartment 40 houses the first strap 18b, the second strap 22a, and hooks 20b and 24a. The second compartment 42 houses the first strap 18d, the second strap 22c, and hooks 20c and 24d. The third compartment 46 houses the first strap 18a, the second strap 22b, and hooks 20a and 24b. The fourth compartment 48 houses the first strap 18c, the second strap 22d, and hooks 20d and 24c.

Figure 7:
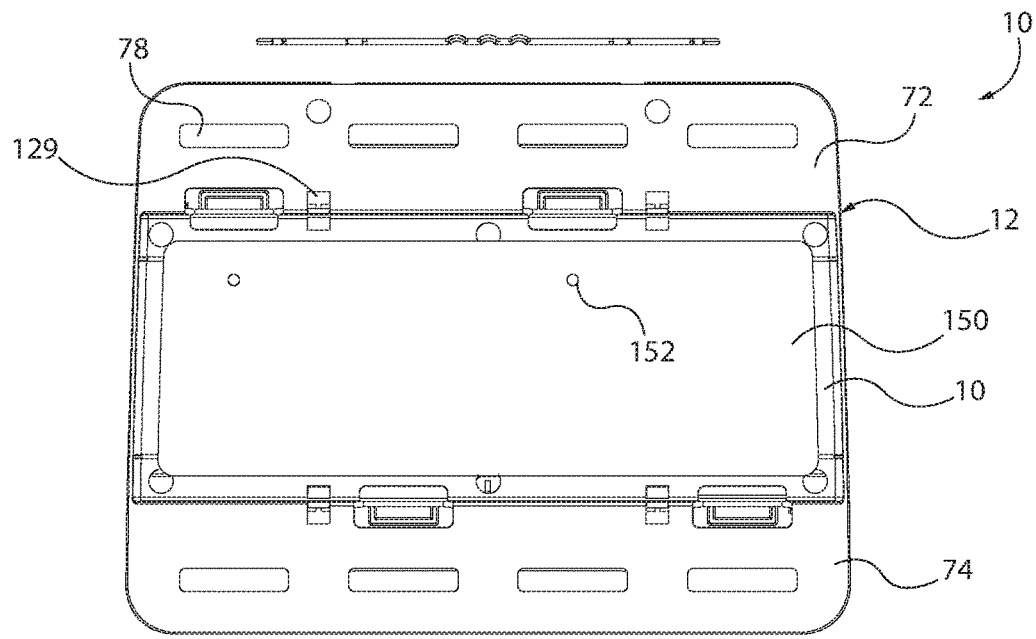
FIG. 7 is a back view of the reusable tie down storage case.
Figure 9:
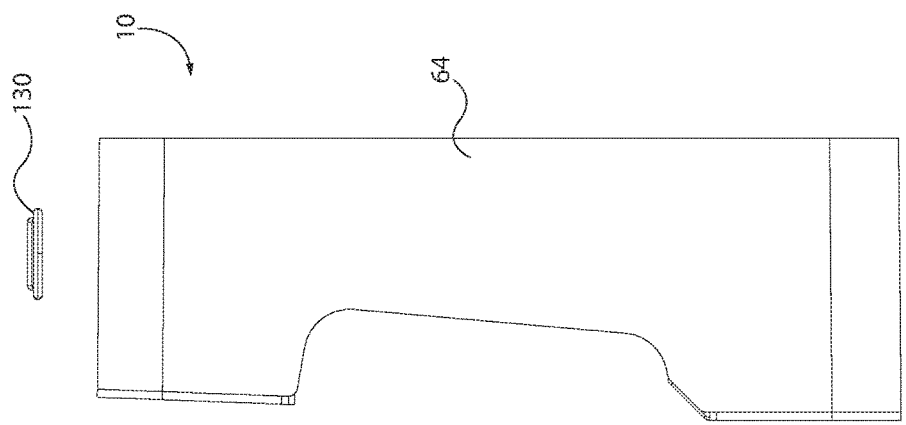
FIG. 9 is a right side view of the reusable tie down storage case.
Figure 8:
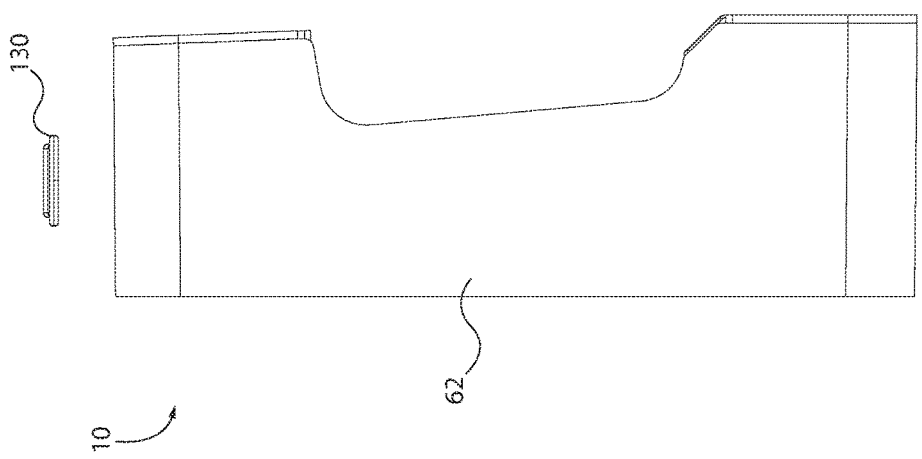
FIG. 8 is a left side view of the reusable tie down storage case.
Figure 10:
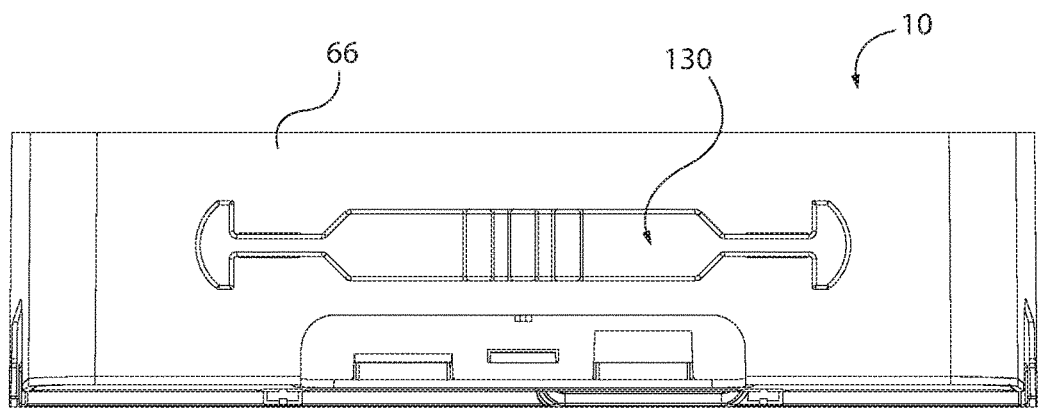
FIG. 10 is a top view of the reusable tie down storage case.
Figure 11:
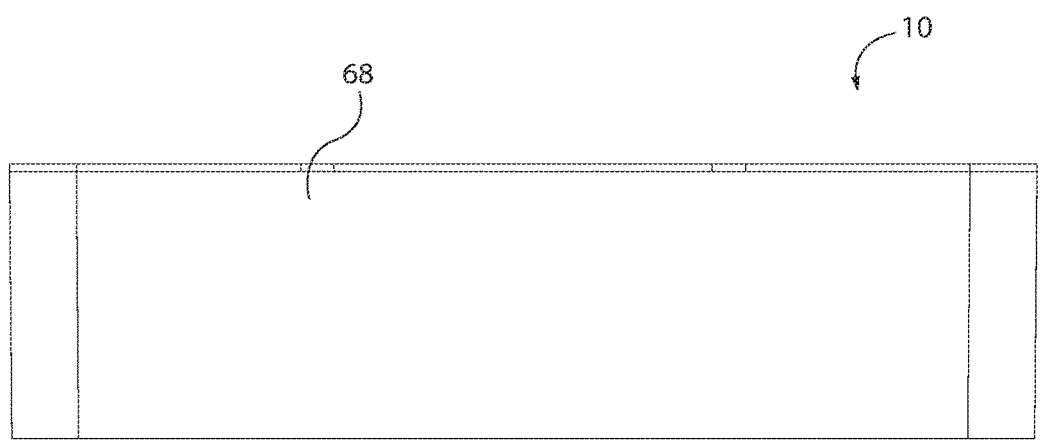
FIG. 11 is a bottom view of the reusable tie down storage case.
Figure 12:
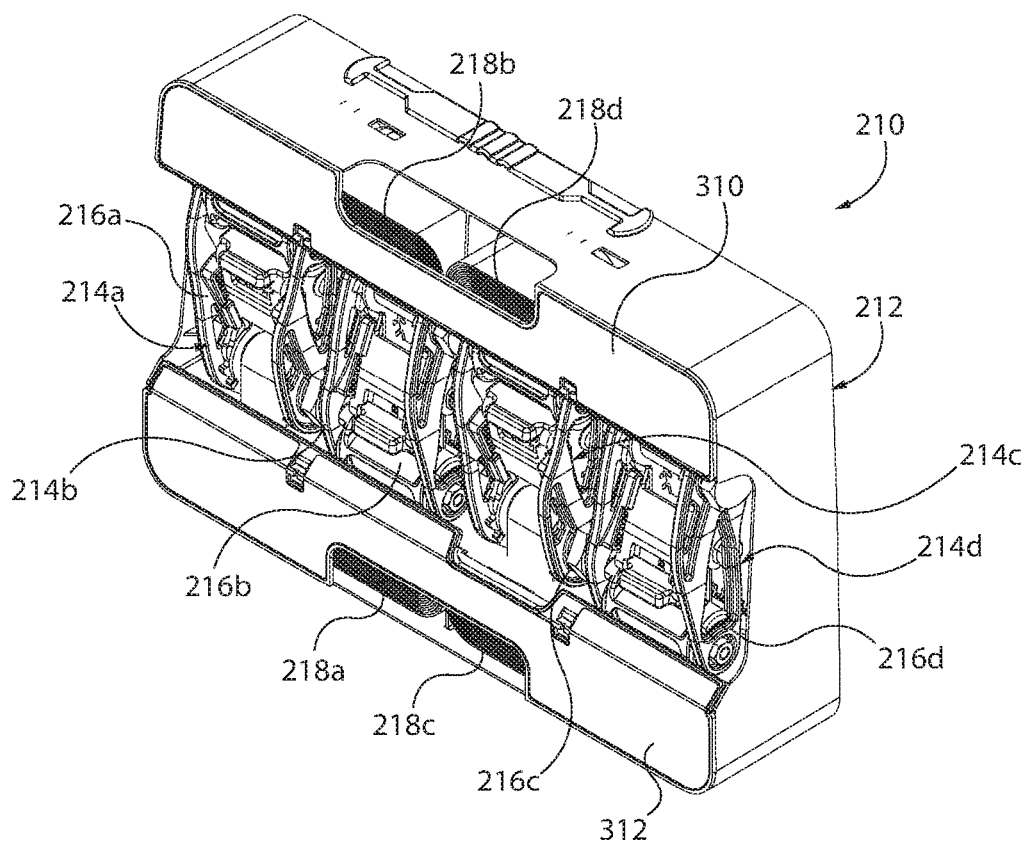
FIG. 12 is a perspective view of another exemplary reusable tie down storage case in a closed position with tie down assemblies.
Figure 13:
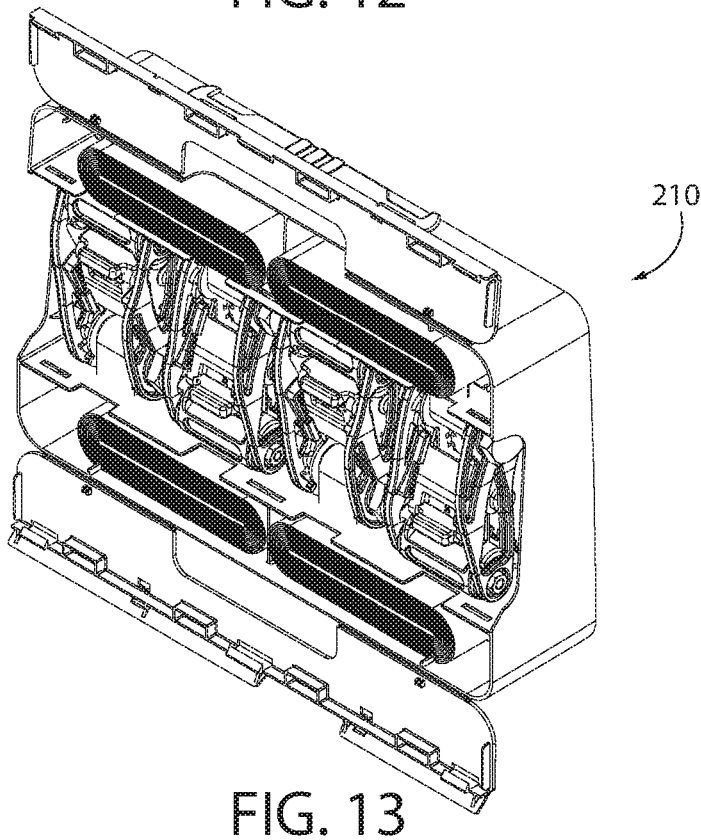
FIG. 13 is a perspective view of the reusable tie down storage case of FIG. 12 in an open position with tie down assemblies.
Figure 14:
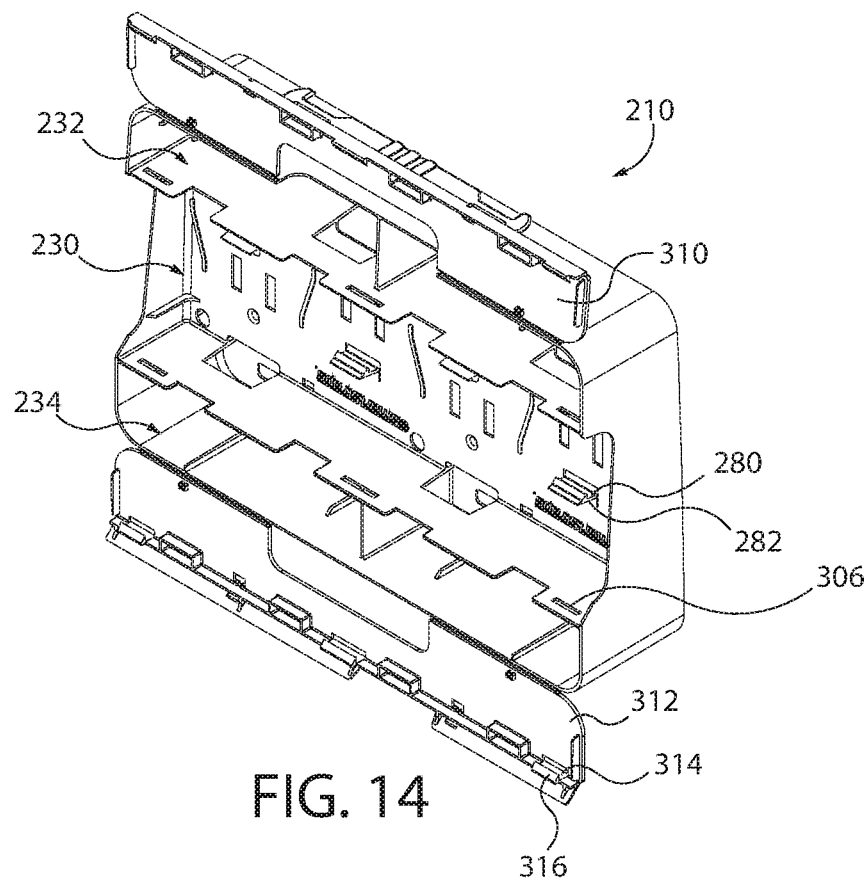
FIG. 14 is a perspective view of the reusable tie down storage case of FIG. 12 in the open position without tie down assemblies.
Figure 15:
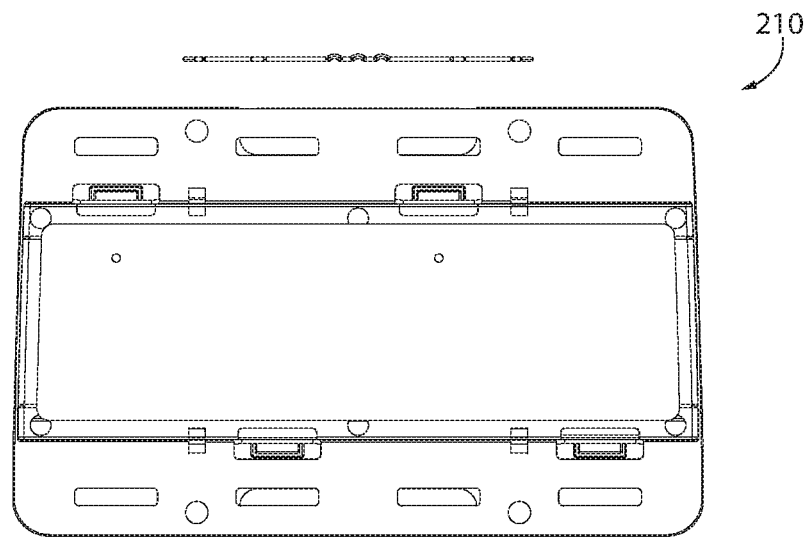
FIG. 15 is a back view of the reusable tie down storage case of FIG. 12.
Figure 17:
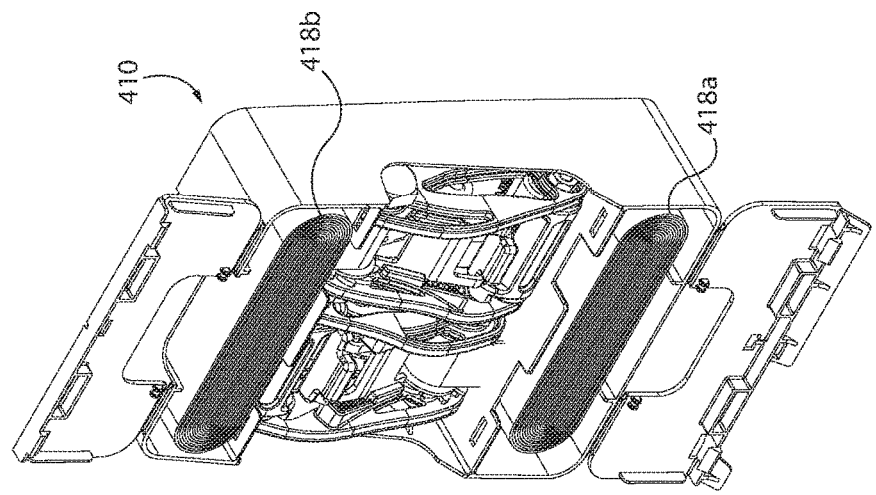
FIG. 17 is a perspective view of the reusable tie down storage case of FIG. 16 in an open position with tie down assemblies.
Figure 16:
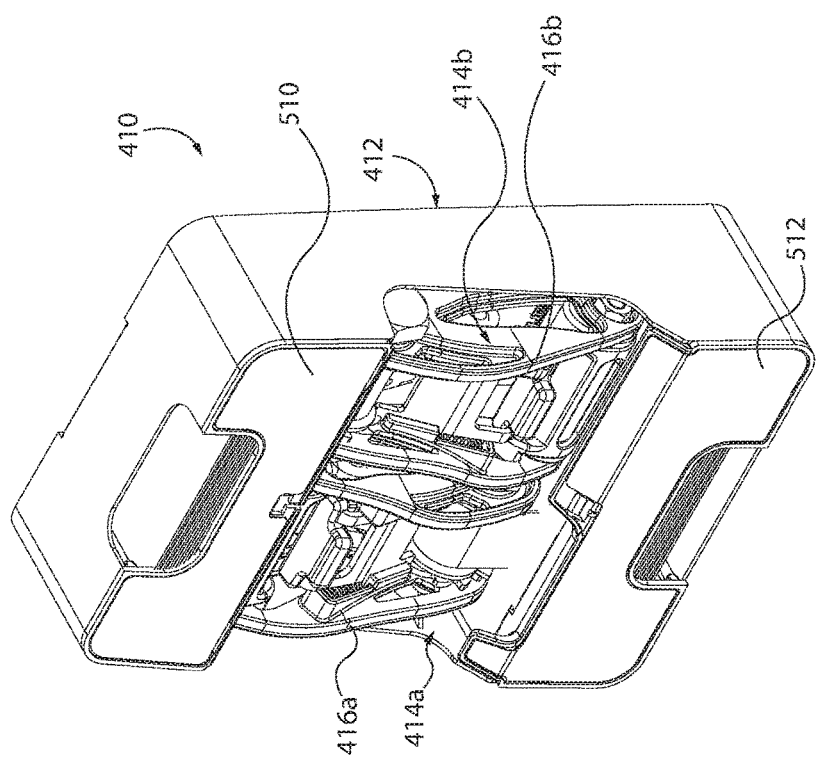
FIG. 16 is a perspective view of still another exemplary reusable tie down storage case in a closed position with tie down assemblies.
Figure 37:
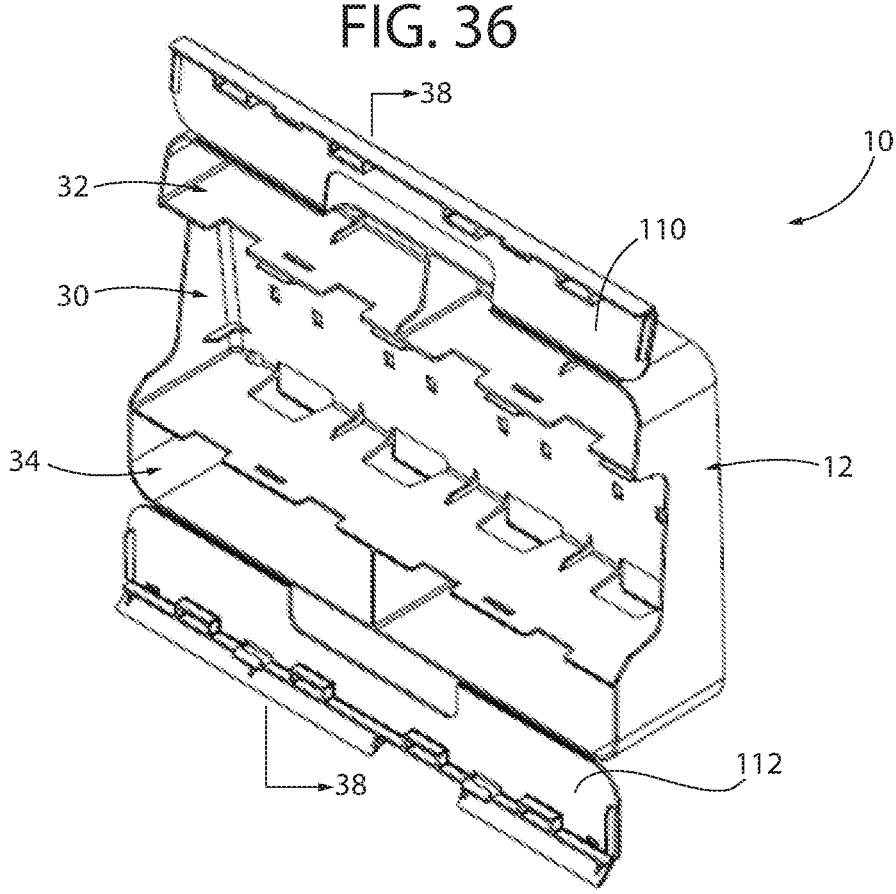
FIG. 37 is a perspective view of still another exemplary reusable tie down storage case in an open position without tie down assemblies.
Figure 38:
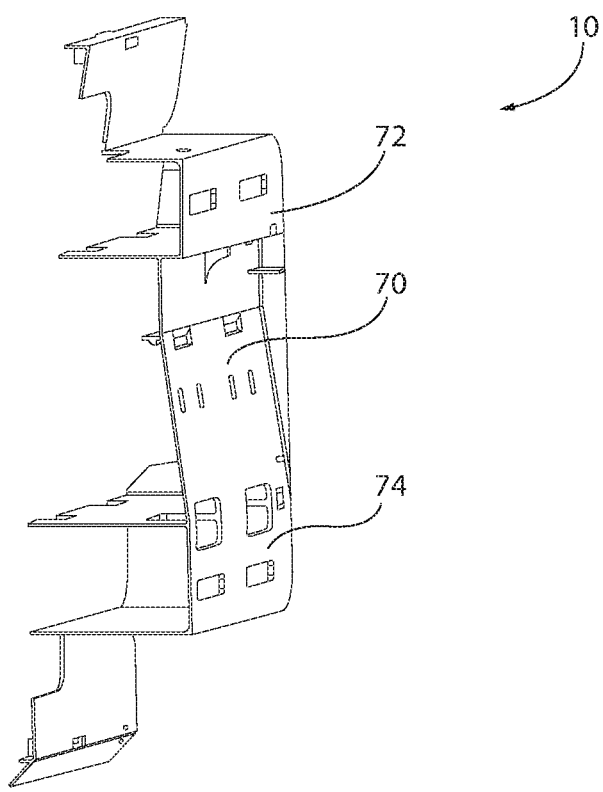
FIG. 38 is a cross-sectional view of the reusable tie down storage case of FIG. 37 taken about line 38-38.

Referring now to the housing 12 in detail, the housing has a bottom portion 60, a pair of side walls 62 and 64 projecting from the bottom portion 60, and a pair of end walls 66 and 68 projecting from the bottom portion to define a cavity having the first, second and third spaces 30, 32, and 34. The bottom portion 60 may be substantially planar or may be formed by a first substantially planar portion 70 that supports the ratchets 16a-16d, which is connected to second and third substantially planar portions 72 and 74 that support the straps and are offset from the first planar portion 66 as shown in FIG. 7. Alternatively, as shown in FIGS. 37 and 38, the first substantially planar portion may be angled to prop the ratchets 14a-14d forward and to assist in insertion and removal of the ratchets. The housing may include openings 76 and 78 that can be provided at suitable locations for material savings.

Projecting from the bottom portion 60 of the housing 12 in the first space 30 is a plurality of deflectable tabs 80 having a catch 82 for engaging a respective one of the tie down assemblies 14a-14d to hold the ratchets 16a-16d in the case without any additional fastener, such as cable ties. The tabs 80 are spaced from one another widthwise in a first direction and height wise in a second direction perpendicular to the first direction to accommodate oppositely oriented ratchets. The tabs can secure the tie down assemblies 14a-14d while allowing a user to test and feel the ratchets, such as ratchet 16c. If desired, for example to deter theft in a retail location, the tie down assemblies 14a-14d can be additionally secured by one or more cable ties, zip ties, etc. that can be fed through openings 84 in the bottom portion 60 and around the tie down assemblies 14a-14d.

The bottom portion 60 also includes indicia 86 in the first space 30 that corresponds to indicia 88 on a handle of the tie down assemblies 14a-14d for providing a guide for orienting and aligning the tie down assemblies 14a-14d in the case 10. The bottom portion 60 can additionally or alternatively include raised angled portions 90 on opposite sides of each tab 80 for providing a guide for orienting and aligning the tie down assemblies 14a-14d.

The housing 12 also includes first and second inner walls 92 and 94 parallel to one another and to the end walls 66 and 68. The first and second inner walls 92 and 94 form with the bottom portion 60 and the side walls 62 and 64 the first space 30. The first inner wall 92 forms with the bottom portion 60, the side walls 62, and the end wall 66 the second space 32, and the second inner wall 94 forms with the bottom portion 60, the side walls 62 and 64, and the end wall 68 the third space 34. The wall 44 is parallel to the side walls 62 and 64 and perpendicular to and connected to the end wall 66 and the first inner wall 92, and the wall 50 is parallel to the side walls 62 and 64 and perpendicular to and connected to the end wall 68 and the second inner wall 94.

The first and second inner walls 92 and 94 each include a plurality of slots 96, and in particular a slot corresponding to each tie down assembly 14a-14d for allowing the straps 18a-d and 22a-d to pass from the first space 30 to the second and third spaces 32 and 34. The slots 96 extend from the top of the first and second inner walls 92 and 94 towards the bottoms such that the inner wall has a battlement shape of peaks 98 and valleys with the slots 96 forming the valleys. One or more of the peaks 98, and as illustrated three peaks of each of the first and second inner walls 92 and 94 includes an opening 100 for receiving a catch of a tab as discussed below. Additionally, the first and second inner walls 92 and 94 may include cut-outs 102 that receive a tooth of one of the ratchets 14a-14d to additionally secure the ratchets.

The storage case 10 additionally includes one or more flaps, and in the illustrated embodiment, two flaps 110 and 112 connected to one of the end walls 66 and 68 respectively and movable between a first position to close the second and third space 32 and 34 respectively and a second position to allow access to the second space and third spaces. The flaps 110 and 112 may be integrally formed with the end walls 66 and 68 respectively, for example by a living hinge as shown, or connected to the end walls in a suitable manner. One or more pairs of ribs 113 may be provided on each flap 110, 112 to engage a respective projection 115 extending from the end wall 66 or 68 to provide support to the living hinge and absorb at least some of the impact if the case is dropped.

Each flap 110, 112 includes one or more tabs 114 having a catch 116 for engaging a respective one of the openings 100 in the first and second inner walls 92 and 94 to hold the flaps 110 and 112 in the first position. As shown, each flap includes a plurality of tabs 114 spaced from one another widthwise in the first direction to engage the respective opening 100 in the peaks 98.

The flaps 110 and 112 also include one or more projections 118, and as illustrated a projection 118 corresponding to each slot 96 that extend into the slots 96 in the first position to hold the straps 18a-18d and 22a-22d in position and reduce shifting of the flaps 110 and 112 in the first position. Similarly, each flap 110 and 112 may include side projections 120 on opposite sides of the flaps 110 and 112 that interact with the side walls 62 and 64 to reduce shifting of the flaps 110 and 112 in the first position.

Figure 6:
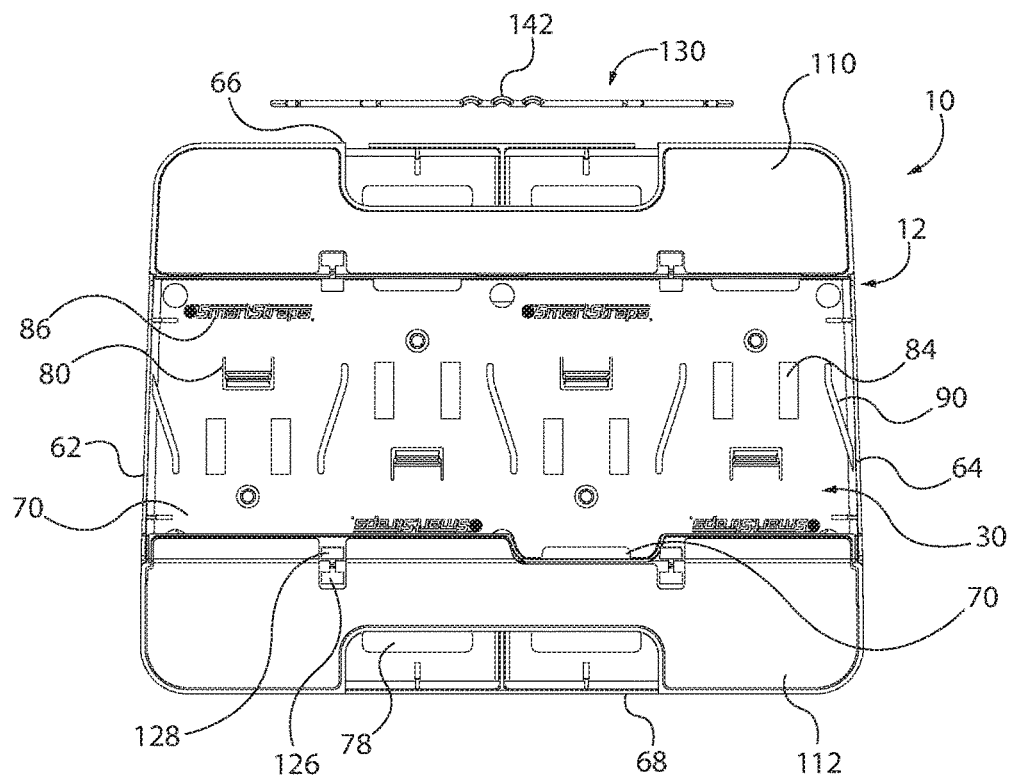
FIG. 6 is a front view of the reusable tie down storage case.

The flaps 110 and 112 may further include one or more cut-outs 122 for viewing the straps 18a-18d and/or 22a-22d when the flaps 110 and 112 are in the first position, and the side walls 62 and 64 may include one or more cut-outs 124 for viewing the ratchets 14a-14d. If desired, as shown in FIGS. 6 and 7, for example to deter theft in a retail location, the flaps 110 and 112 can be additionally secured by one or more cable ties, zip ties, etc. that can be fed through openings 126 and 128 in each flap, and in the illustrated embodiment at multiple locations in each flap, and through respective openings 129 in the bottom portion 60.

It will be appreciated that the housing, tabs, and flaps may be molded as a one-piece assembly, or alternatively formed in separate parts and connected together.

The reusable tie down storage case 10 can be displayed in a store either by placing the bottom of the case 10 (the end wall 68) on a shelf, or by hanging the case on a hook using a flexible handle 130. The handle 130 includes a grip/hanging area 132 and tabs 134 and 136 that are removably received in openings 138 and 140 in the end wall 66 to secure the handle 130 to the housing 12. The handle 130 can include one or more channels 142 on an underside of the grip/hanging area 132 for supporting the case 10 on the hook and for preventing shifting/swaying/sliding of the case. For example, the handle 130 can include three channels 142 such that if being hung on a single hook, a middle channel indexes on the hook and if being hung on a double hook, the outer channels index on the hooks.

Referring to FIG. 7, a rear label 150 of the case 10 is shown. The label 150 is fixed to the bottom portion 60 at one or more places and in particular the first substantially planar portion 70. For example, the label 150 can be fixed to the first substantially planar portion 70 near the second substantially planar portion 72 by one or more plugs extending through openings 152 in the label and through openings 154 (FIG. 3) in the bottom portion 60 to allow the label 150 to be flexed from the bottom up to provide access to openings 84. The label 150 can be made from a suitable material that resists permanent bending and high humidity to maintain the label during the life of the case.

Turning now to FIGS. 12-15, an exemplary embodiment of the storage case is shown at 210. The storage case 210 is substantially the same as the above-referenced storage case 10 but houses tie down assemblies rated for a higher weight rating than the storage case 10, and consequently the same reference numerals but indexed by 200 are used to denote structures corresponding to similar structures in the storage cases.

The reusable tie down storage case 210 includes a housing 212 for storing and displaying a plurality of tie down assemblies 214a-214d that each include a ratchet 216a-216d having a first strap 218a-218d with a hook (not shown) and a second strap (not shown) with a hook (not shown). The housing 212 has a first space 230 for receiving the ratchets 216a-216d, and second and third spaces 232 and 234 for receiving the straps and hooks. The storage case includes a plurality of tabs 280 having a catch 282 projecting from the housing 212 for engaging the tie down assemblies 214a-214d, and flaps 310 and 312 for closing the second and third spaces 232 and 234, respectively. Each flap 310, 312 includes one or more tabs 314 having a catch 316 for engaging a respective opening 300 in walls of the housing 212.

Turning now to FIGS. 16-19, an exemplary embodiment of the storage case is shown at 410. The storage case 410 is substantially the same as the above-referenced storage case 10 but houses two tie down assemblies, and consequently the same reference numerals but indexed by 400 are used to denote structures corresponding to similar structures in the storage cases. In addition, the foregoing description of the storage case 10 is equally applicable to the storage case 410 except as noted below.

The reusable tie down storage case 410 includes a housing 412 for storing and displaying tie down assemblies 414a and 414b that each include a ratchet 416a, 416b having a first strap 418a, 418b with a hook (not shown) and a second strap (not shown) with a hook (not shown). The housing 412 has a first space 430 for receiving the ratchets 416a and 416b, and second and third spaces 432 and 434 for receiving the straps and hooks. The storage case includes a plurality of tabs 480 having a catch 482 projecting from the housing 412 for engaging the tie down assemblies 414a and 414b, and flaps 510 and 512 for closing the second and third spaces 432 and 434, respectively. Each flap 510, 512 includes one or more tabs 514 having a catch 516 for engaging a respective opening 500 in walls of the housing 412.

Figure 19:
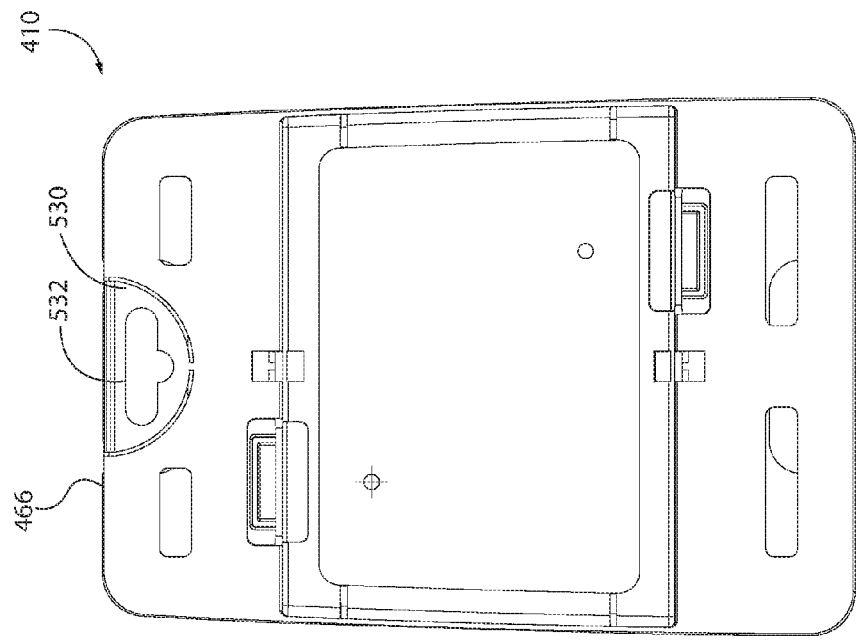
FIG. 19 is a back view of the reusable tie down storage case of FIG. 16.
Figure 18:
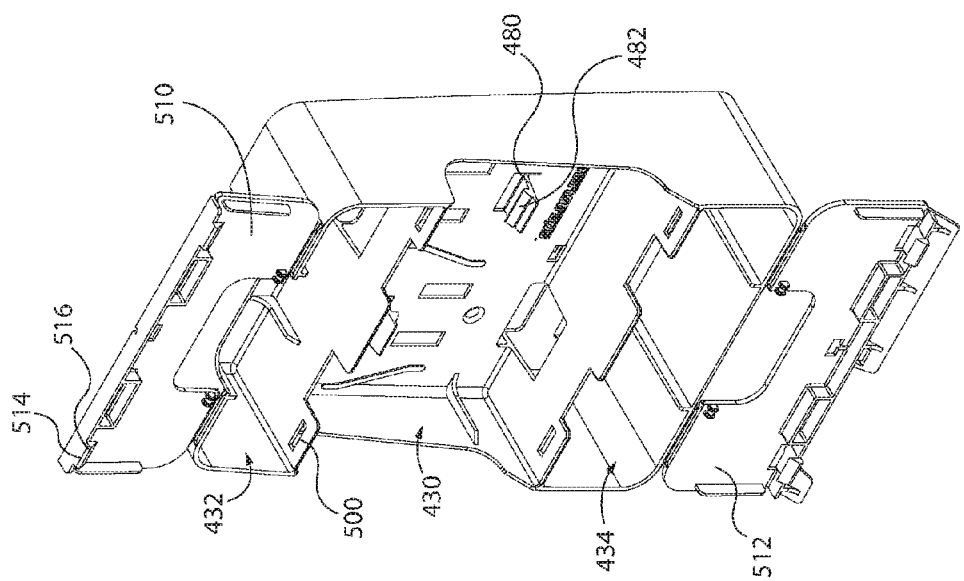
FIG. 18 is a perspective view of the reusable tie down storage case of FIG. 16 in the open position without tie down assemblies.
Figure 21:
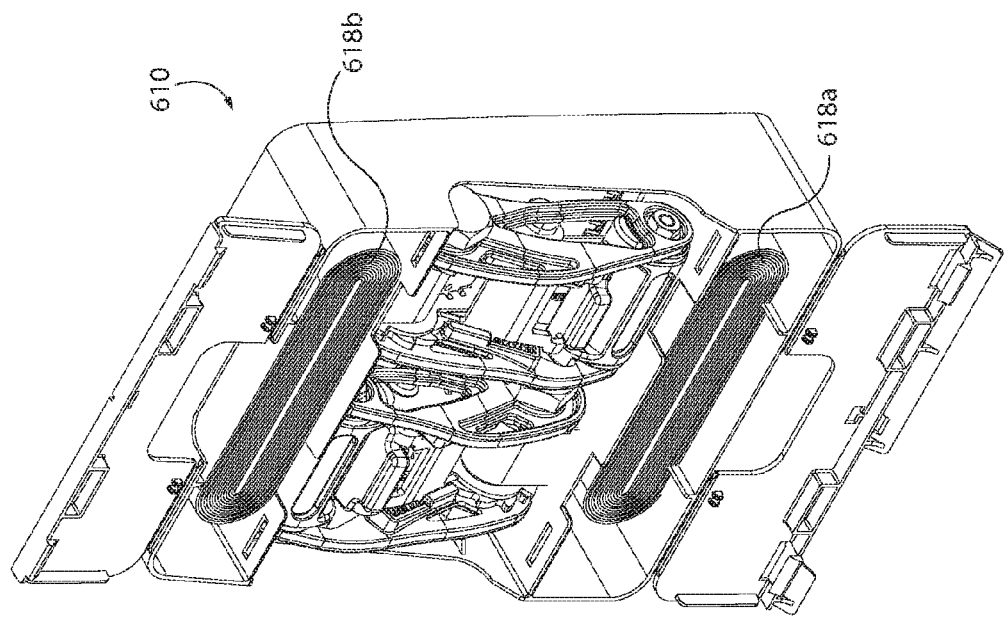
FIG. 21 is a perspective view of the reusable tie down storage case of FIG. 20 in an open position with tie down assemblies.
Figure 20:
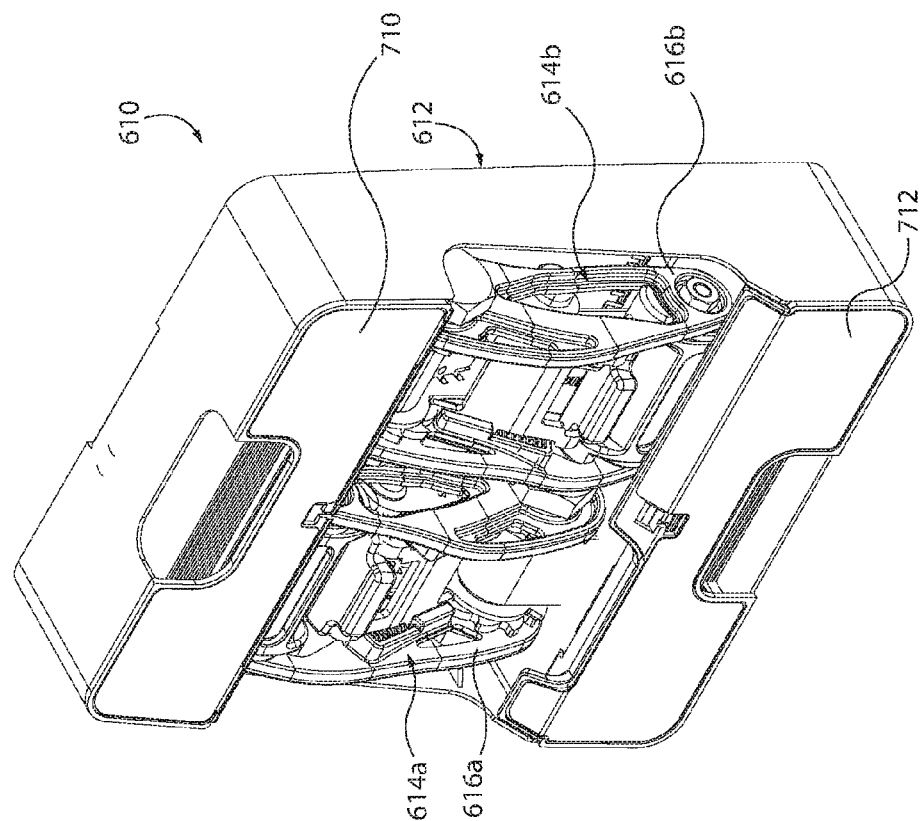
FIG. 20 is a perspective view of a further exemplary reusable tie down storage case in a closed position with tie down assemblies.

As shown in FIG. 19, the storage case 410 also includes a flap/tab 530 for hanging the case on a hook. The flap 530 includes an opening 532 having various portions for supporting the case 410 on the hook and for preventing shifting/swaying/sliding of the case. The flap 530 may be integrally formed with the end wall 466, for example by a living hinge, and may be folded down when not in use as shown.

Turning now to FIGS. 20-23, an exemplary embodiment of the storage case is shown at 610. The storage case 610 is substantially the same as the above-referenced storage case 210 but houses two tie down assemblies, and consequently the same reference numerals but indexed by 400 are used to denote structures corresponding to similar structures in the storage cases. In addition, the foregoing description of the storage case 210 is equally applicable to the storage case 410 except as noted below.

The reusable tie down storage case 610 includes a housing 612 for storing and displaying tie down assemblies 614a and 614b that each include a ratchet 616a, 616b having a first strap 618a, 618b with a hook (not shown) and a second strap (not shown) with a hook (not shown). The housing 612 has a first space 630 for receiving the ratchets 616a and 616b, and second and third spaces 632 and 634 for receiving the straps and hooks. The storage case includes a plurality of tabs 680 having a catch 682 projecting from the housing 612 for engaging the tie down assemblies 614a and 614b, and flaps 710 and 712 for closing the second and third spaces 632 and 634, respectively. Each flap 710, 712 includes one or more tabs 714 having a catch 716 for engaging a respective opening 700 in walls of the housing 612.

Figure 23:
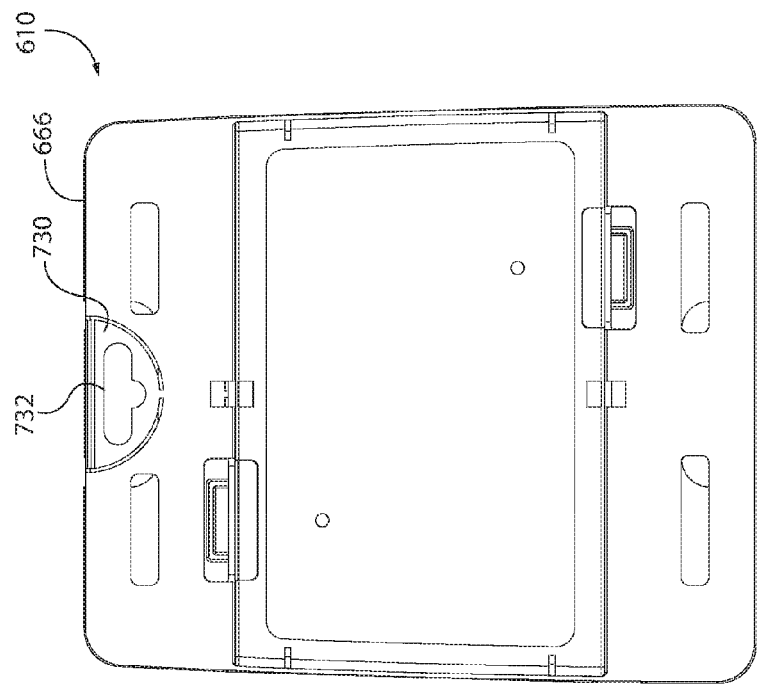
FIG. 23 is a back view of the reusable tie down storage case of FIG. 20.
Figure 22:
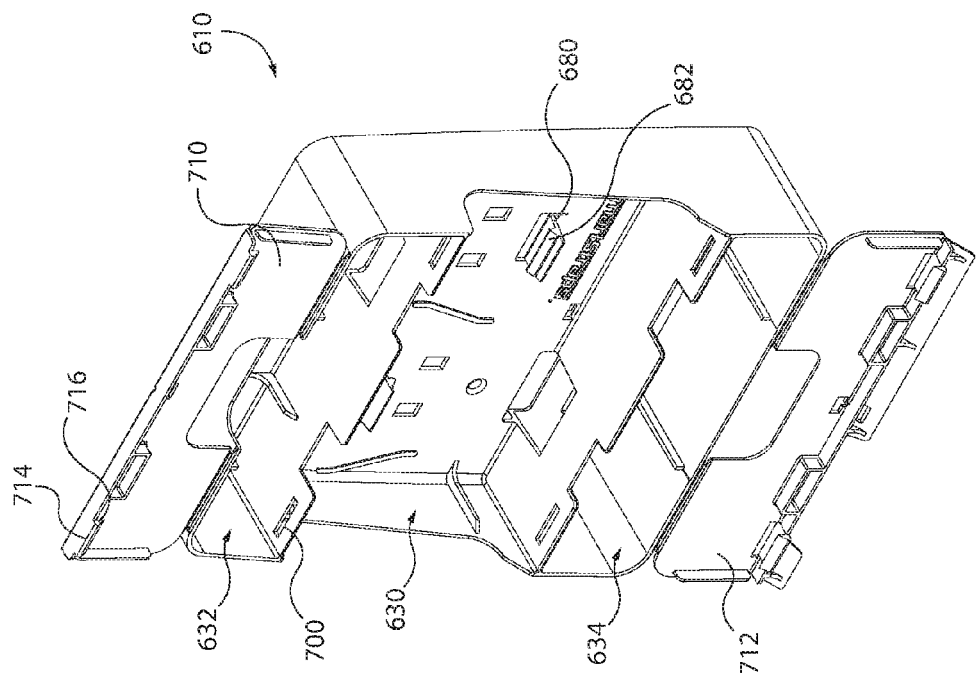
FIG. 22 is a perspective view of the reusable tie down storage case of FIG. 20 in the open position without tie down assemblies.
Figure 24:
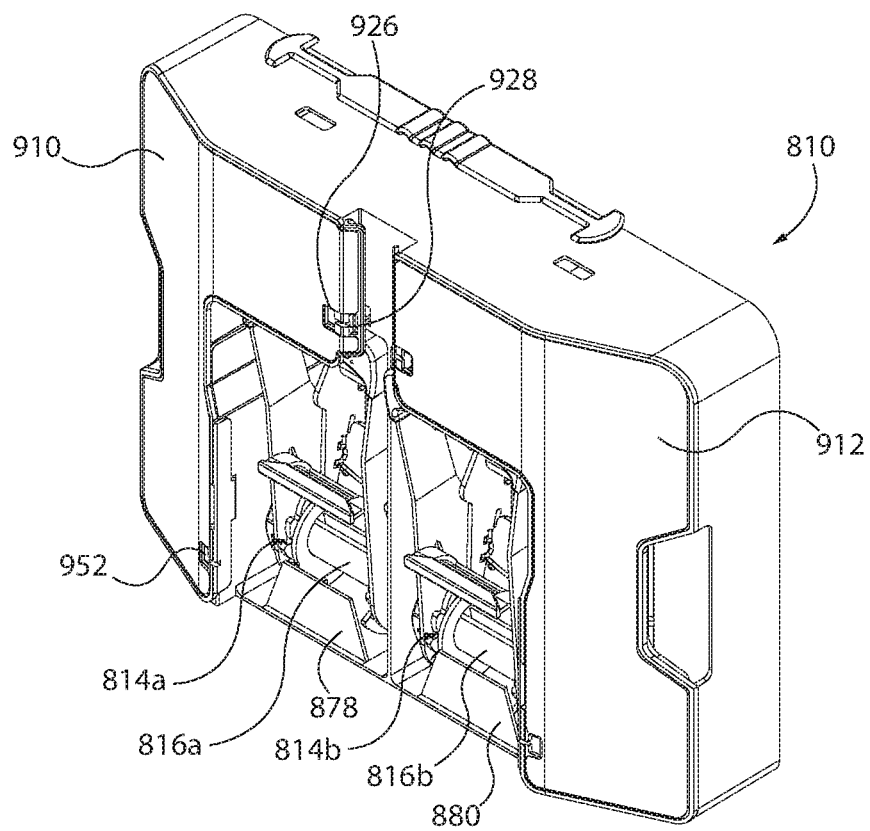
FIG. 24 is a perspective view of yet another exemplary reusable tie down storage case in a closed position with tie down assemblies.
Figure 25:
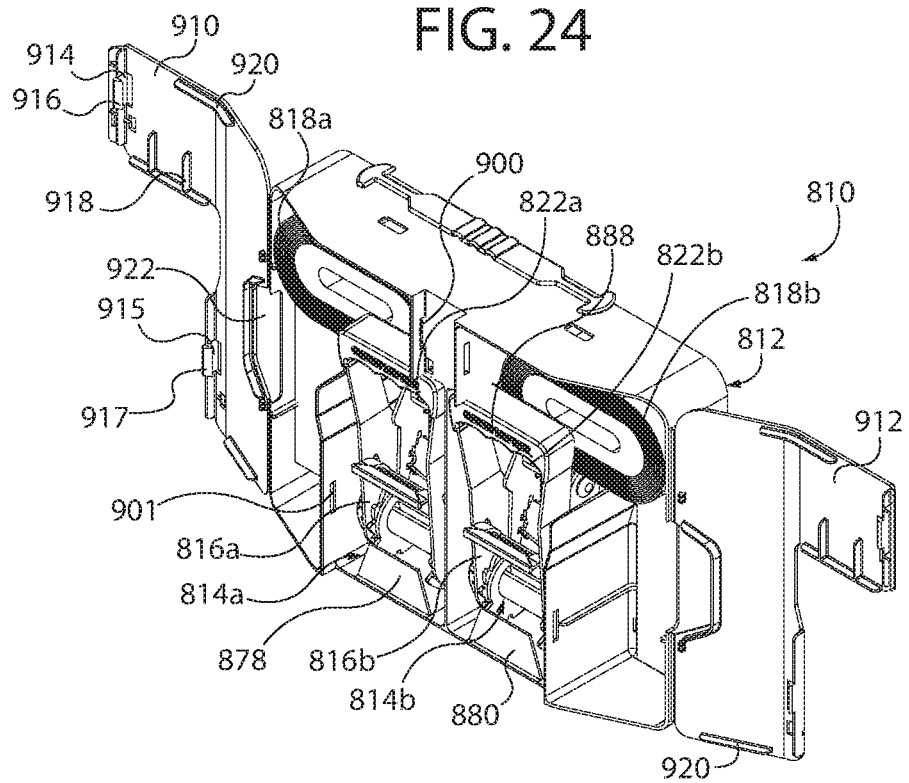
FIG. 25 is a perspective view of the reusable tie down storage case of FIG. 24 in an open position with tie down assemblies.
Figure 26:
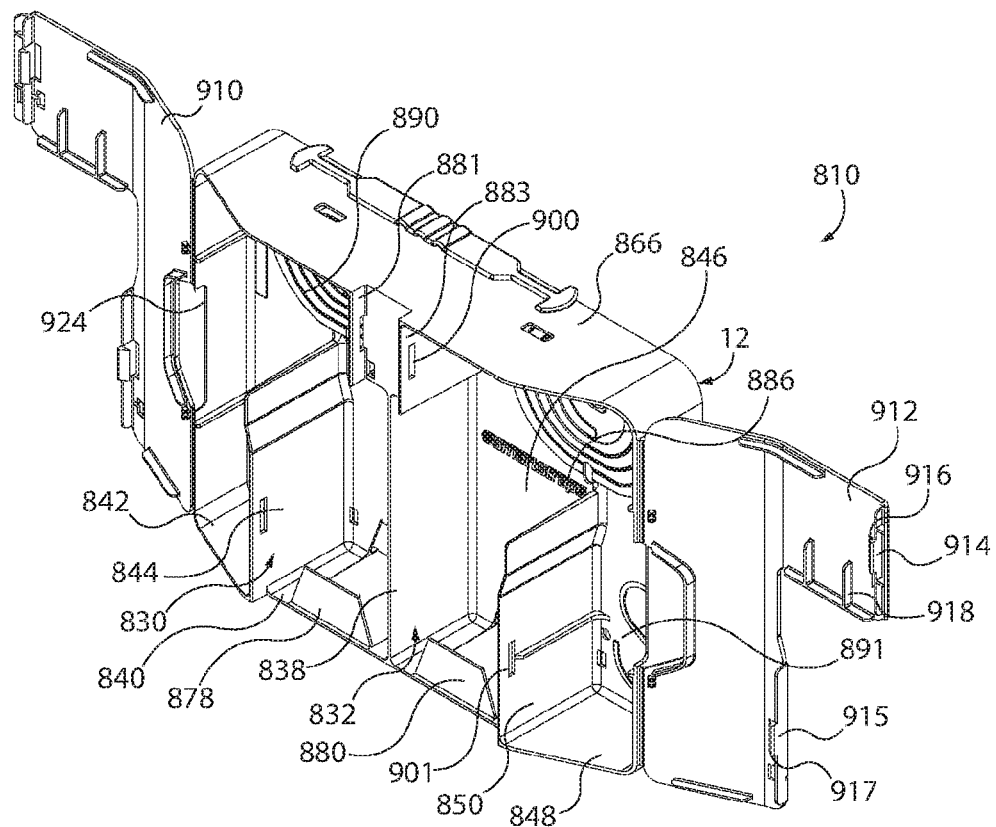
FIG. 26 is a perspective view of the reusable tie down storage case of FIG. 24 in the open position without tie down assemblies.
Figure 27:
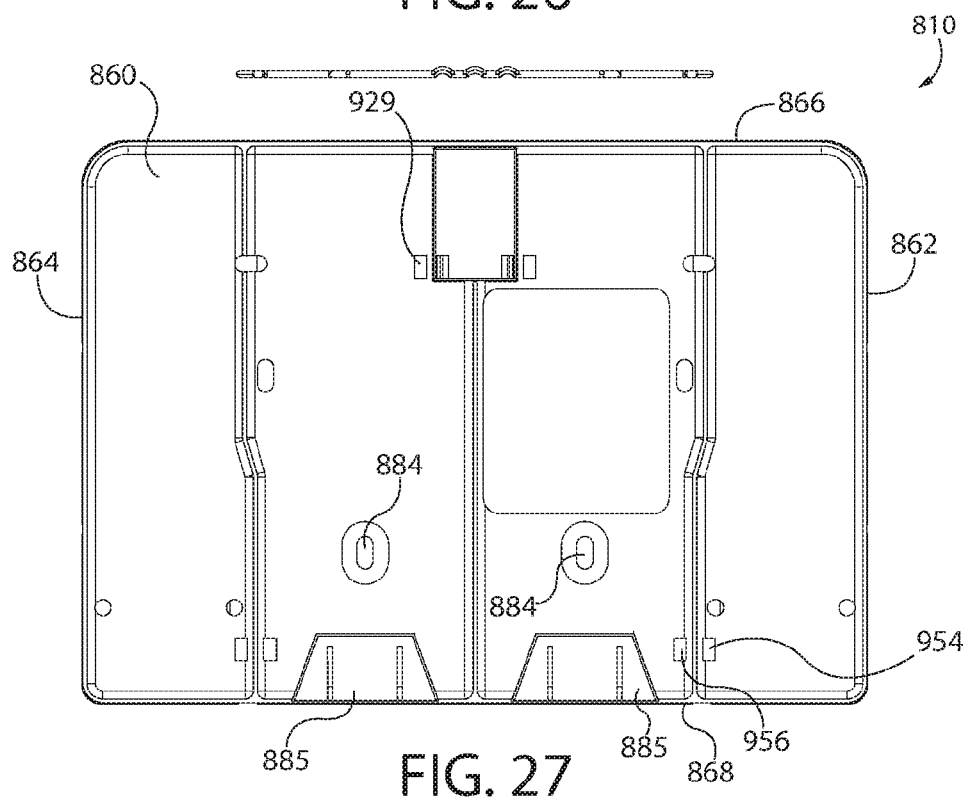
FIG. 27 is a back view of the reusable tie down storage case of FIG. 24.
Figure 28:
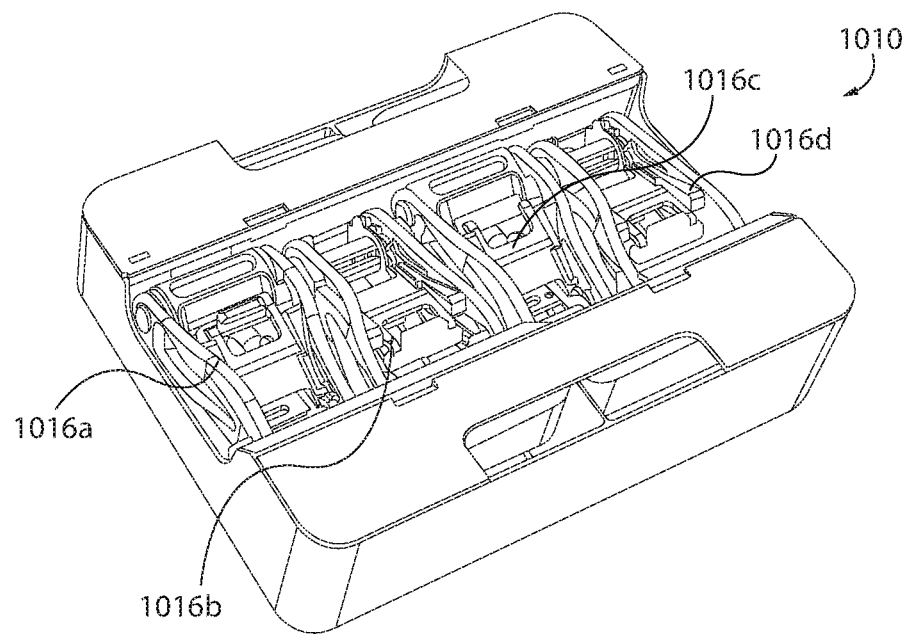
FIG. 28 is a perspective view of another exemplary reusable tie down storage case in a closed position with tie down assemblies.

As shown in FIG. 23, the storage case 610 also includes a flap/tab 730 for hanging the case on a hook. The flap 730 includes an opening 732 having various portions for supporting the case 610 on the hook and for preventing shifting/swaying/sliding of the case. The flap 730 may be integrally formed with the end wall 666, for example by a living hinge, and may be folded down when not in use as shown.

Turning now to FIGS. 24-27, an exemplary embodiment of the ratchet storage case is shown at 810. The ratchet storage case 810 is substantially the same as the above-referenced ratchet storage case 10, and consequently the same reference numerals but indexed by 800 are used to denote structures corresponding to similar structures in the cases. In addition, the foregoing description of the ratchet storage case 10 is equally applicable to the ratchet storage case 810 except as noted below.

The storage case 810 includes a housing 812 for storing and displaying a pair of tie down assemblies 814a and 814b. Each tie down assembly includes a ratchet 816a, 816b having a first strap 818a, 818b with a hook (not shown) and a second strap 822a, 822b with a hook (not shown). The housing 812 has a first space 830 for receiving the ratchet 816a, the straps 818a and 822a, and the hooks of the first assembly 814a, and a second space 832 for receiving the ratchet 816b, the straps 818b and 822b, and the hooks of the first assembly 814b. The first and second spaces 830 and 832 are adjacent one another and the tie down assemblies 814a and 814b are oriented in the same direction.

The first and second spaces 830 and 832 are separated by a wall 838. The first space 830 is separated into first and second compartments 840 and 842, in part by a wall 844, and the second space 832 is separated into third and fourth compartments 846 and 848, in part by a wall 850. The first compartment 840 houses the ratchet 816a, and the second compartment 842 houses the first strap 818a, the second strap 822a, and hooks of the first tie down assembly 814a. The third compartment houses the ratchet 816b, and the fourth compartment 848 houses the first strap 818b, the second strap 822b, and hooks of the second tie down assembly 814b.

Referring now to the housing 812 in detail, the housing has a bottom portion 860, a pair of side walls 862 and 864 projecting from the bottom portion 860, and a pair of end walls 866 and 868 projecting from the bottom portion to define a cavity having the first and second spaces 830 and 832. The bottom portion 860 may be substantially planar.

Projecting from the end wall 868 of the housing 812 in the first space 830 is a first tab 878 and in the second space 832 a second tab 880 that with the bottom portion 860 retain the respective tie down assemblies 814a and 814b to the first and second spaces 830 and 832 respectively. Projecting from the back portion 860, either as part of the wall 838 or as separate elements, are projections 881 and 883 on opposite sides of the wall 838 and parallel to the wall 838. The projections extend from the bottom portion 860 farther than the wall 838. The projections 881 and 883 engage a top or handle portion of the ratchets 816a and 816b respectively to prevent shifting of the ratchets 816a and 816b. If desired, for example to deter theft in a retail location, the tie down assemblies 814a and 814b can be secured by one or more cable ties, zip ties, etc. that can be fed through openings 884 and 885 in the bottom portion 860 and around the tie down assemblies 814a and 814b.

The bottom portion 860 also includes indicia 886 in the first and second spaces 830 and 832 that corresponds to indicia 888 on a handle of the tie down assemblies 814a and 814b for providing a guide for orienting and aligning the tie down assemblies 814a and 814b in the case 810. The bottom portion 860 can also include indicia 890 in the first and second spaces 830 and 832 for providing a guide for orienting the straps 818a and 818b and indicia 891 in the first and second spaces 830 and 832 for providing a guide for orienting the hooks.

The storage case 810 additionally includes one or more flaps, and in the illustrated embodiment, two flaps 910 and 912 connected to one of the side walls 862 and 864 respectively and movable between a first position to close the second and fourth compartments 842 and 848 respectively and a second position to allow access to the compartments. The flaps 910 and 912 also secure the ratchets 816a and 816b in the case. The flaps 910 and 912 may be substantially L-shaped and integrally formed with the side walls 862 and 864 respectively, for example by a living hinge as shown, or connected to the side walls in a suitable manner.

Each flap 910, 912 includes one or more tabs 914 having a catch 916 for engaging a respective one of openings 900 in the projections 881 and 883 and one or more tabs 915 having a catch 917 for engaging a respective one of openings 901 in the walls 844 and 850 to hold the flaps 910 and 912 in the first position. As shown, each flap includes a tab 914 on its horizontal portion and a tab 915 on its vertical portion.

The flaps 910 and 912 also include one or more projections 918 to hold the straps 818a and 818b in position and one or more projections 920 on opposite ends of the flaps 910 and 912 that interact with the end walls 866 and 868 to reduce shifting of the flaps 910 and 912 in the first position. The flaps 910 and 912 may further include one or more cut-outs 922 for viewing the straps 818a and 818b and/or 822a and 822b when the flaps 910 and 912 are in the first position and the side walls 862 and 864 may include one or more cut-outs 924 aligned with the cut-outs 922. If desired, for example to deter theft in a retail location, the flaps 910 and 912 can be additionally secured by one or more cable ties, zip ties, etc. that can be fed through openings 926 and 928 in each flap and through respective openings 929 in the bottom portion 860. Additionally or alternatively, one or more cable ties, zip ties, etc. can be fed through opening 952 in each flap and through respective openings 954 and 956 in the bottom portion 860.

The reusable tie down storage case 810 can be displayed in a store either by placing the bottom of the case 810 (the end wall 868) on a shelf, or by hanging the case on a hook using a flexible handle 930.

Turning now to FIGS. 28-31, an exemplary embodiment of the ratchet storage case is shown at 1010. The ratchet storage case 1010 is substantially the same as the above-referenced ratchet storage case 10, and consequently the same reference numerals but indexed by 1000 are used to denote structures corresponding to similar structures in the cases. In addition, the foregoing description of the ratchet storage case 10 is equally applicable to the ratchet storage case 1010 except as noted below.

Figure 29:
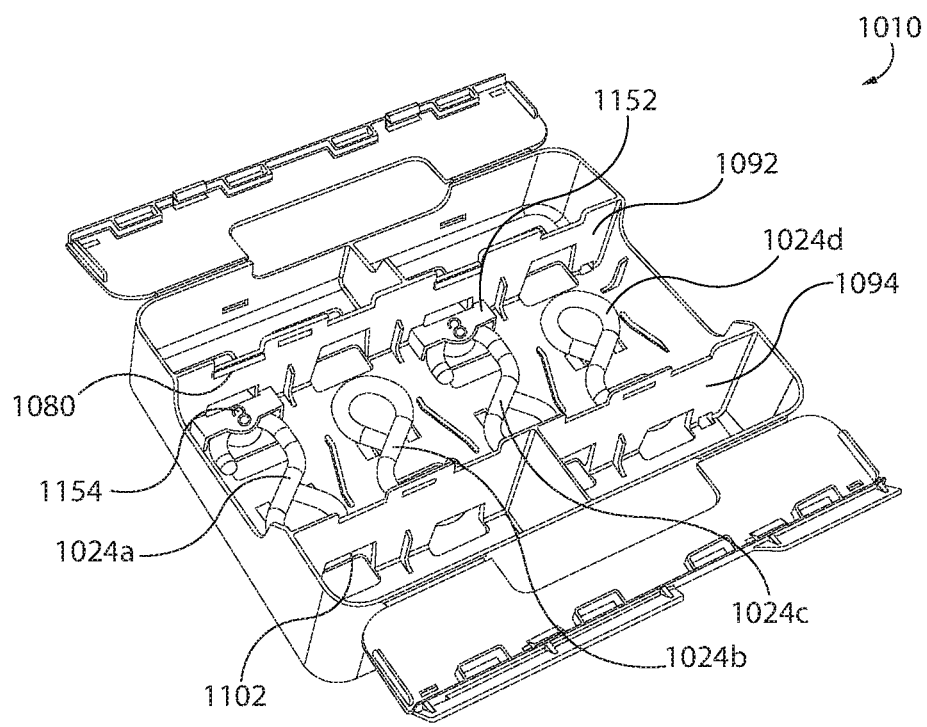
FIG. 29 is a perspective view of the reusable tie down storage case of FIG. 28 in the open position without tie down assemblies.
Figure 30:
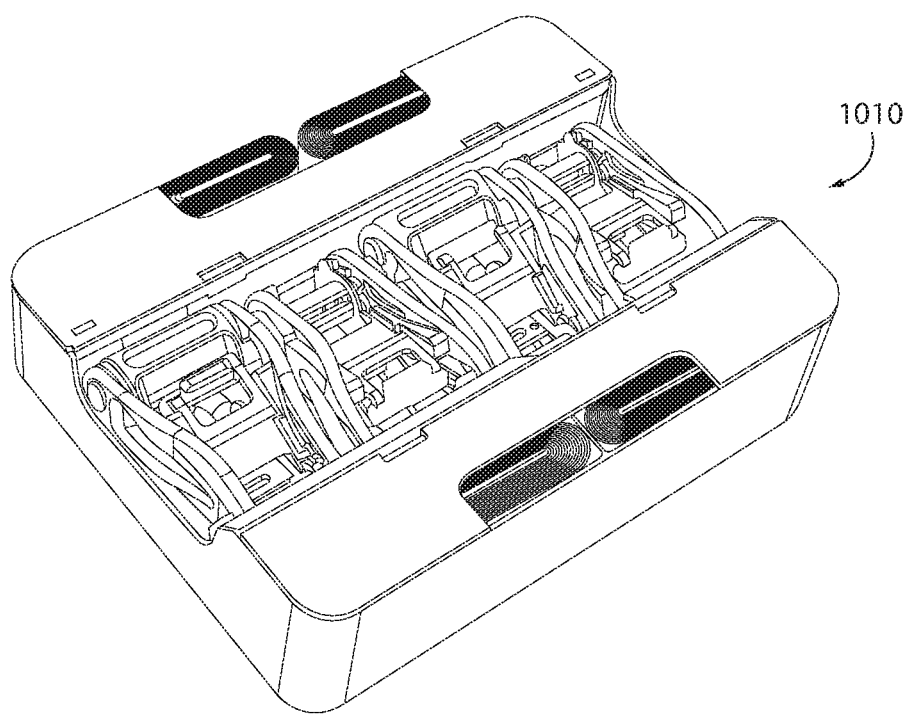
FIG. 30 is a perspective view of still another exemplary reusable tie down storage case in a closed position with tie down assemblies.
Figure 31:
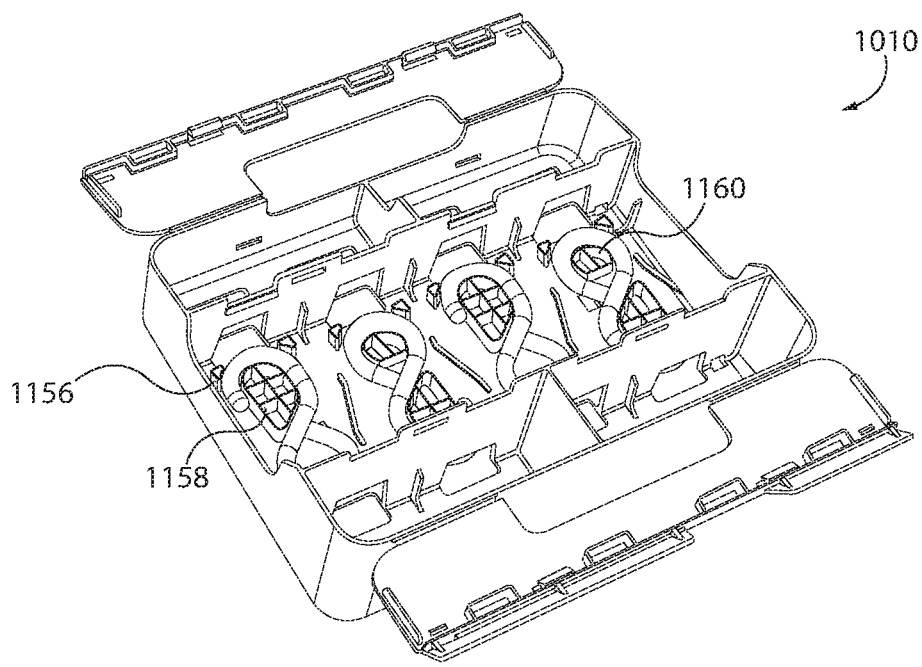
FIG. 31 is a perspective view of the reusable tie down storage case of FIG. 30 in an open position without tie down assemblies.

As shown in FIGS. 29 and 31, projecting from the first and second inner walls 1092 and 1094 are the tabs 1080 for securing the ratchets 1016a-1016d, and the openings 1102 are provided in the first and second inner walls 1092 and 1094 to assist in retention of the ratchets 1016a-1016d.

The hooks 1024a-1024d connected to the second straps (not shown) are held below the ratchets 1016a-1016d. As shown in FIG. 29, an end of each hook 1024a-1024d is inserted below a hook retainer 1152 projecting from the bottom portion 1060 and forming a slot. The hook retainers 1152 are oppositely oriented in the first direction and can include indicia 1154 for providing a guide for orienting the hooks 1024a-1024d. Alternatively, as shown in FIG. 31, a plurality of protrusions extend from the bottom portion 1060 such that edge protrusions 1156 surround outer edges of each hook 1024a-1024d and inner protrusions 1158 and 1160 are within and surrounded by the hooks. The hooks can be secured to the bottom portion 1060 without pivoting or sliding.

Turning now to FIGS. 32-35, an exemplary embodiment of the ratchet storage case is shown at 1210. The ratchet storage case 1210 is substantially the same as the above-referenced ratchet storage case 10, and consequently the same reference numerals but indexed by 1200 are used to denote structures corresponding to similar structures in the cases. In addition, the foregoing description of the ratchet storage case 10 is equally applicable to the ratchet storage case 1210 except as noted below.

The storage case includes a housing 1212 for storing and displaying a plurality of tie down assemblies 1214a-1214d. Each tie down assembly includes a ratchet 1216a-1216d having a first strap 1218a-1218d with a hook 1220a-1220d and a second strap (not shown) with a hook (not shown). The housing 1212 has a first space 1230 or tie down storage area for receiving the ratchets 1216a-1216d, and a second space 1232 or strap storage area for receiving the straps. The second space 1232 is provided above the first space 1230. The tie down assemblies 1214a-1214d are oriented in the first space 1230 in the same direction.

The first space 1230 is divided into first, second, third, and fourth compartments 1360, 1362, 1364, 1366 by walls 1368, 1370, and 1372, and the second space 1232 is divided into first, second, third, and fourth compartments 1240, 1242, 1246, and 1248 by walls 1244, 1250, and 1252. The compartments 1360, 1362, 1364, and 1366 house the ratchets 1216a-1216d respectively and the compartments 1240, 1242, 1246, and 1248 house the straps 1218a-1218d and hooks 1220a-1220d. The other straps and hooks can be housed in either the first or second spaces 1230 and 1232. A flap 1310 is provided connected to the end wall 1266 and movable between a first position to close the second space 1232 and a second position to allow access to the second space.

One or more bands, and in the illustrated embodiment a plurality of elastic bands 1280 are provided to hold the ratchets 1216a-1216d in the first space 1230. The bands may be individually secured to the package as shown or formed from a single piece of elastic material that is fed through features on the package that allows for the creation of multiple loops.

Figure 32:
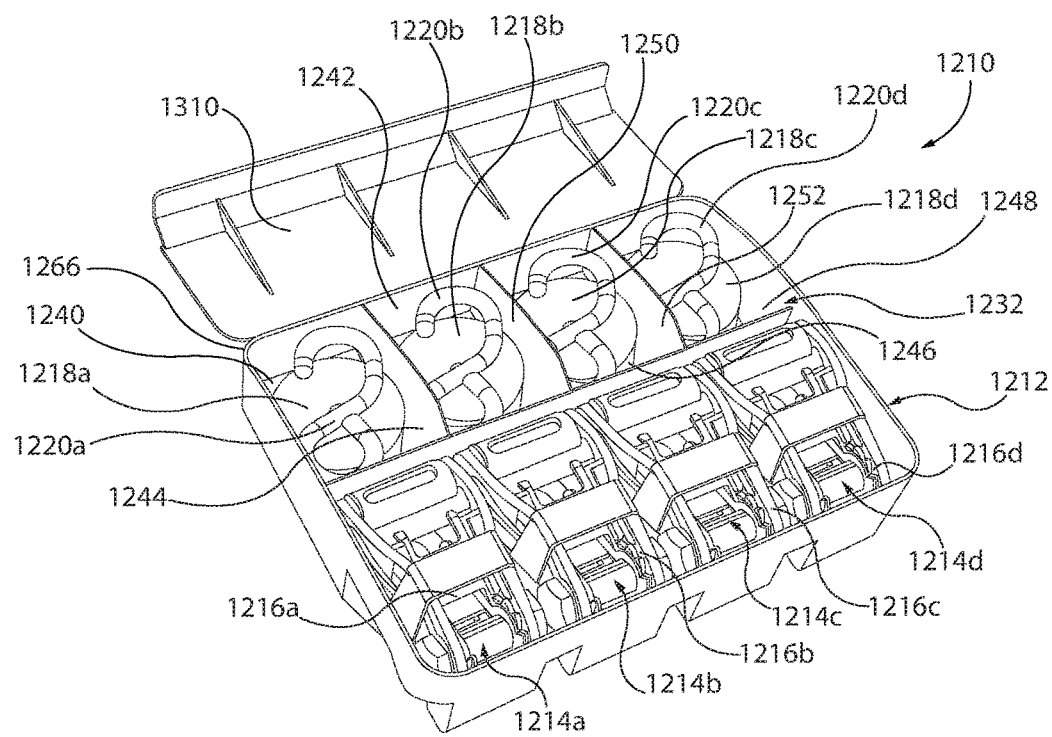
FIG. 32 is a perspective view of yet another exemplary reusable tie down storage case in an open position with tie down assemblies.
Figure 33:
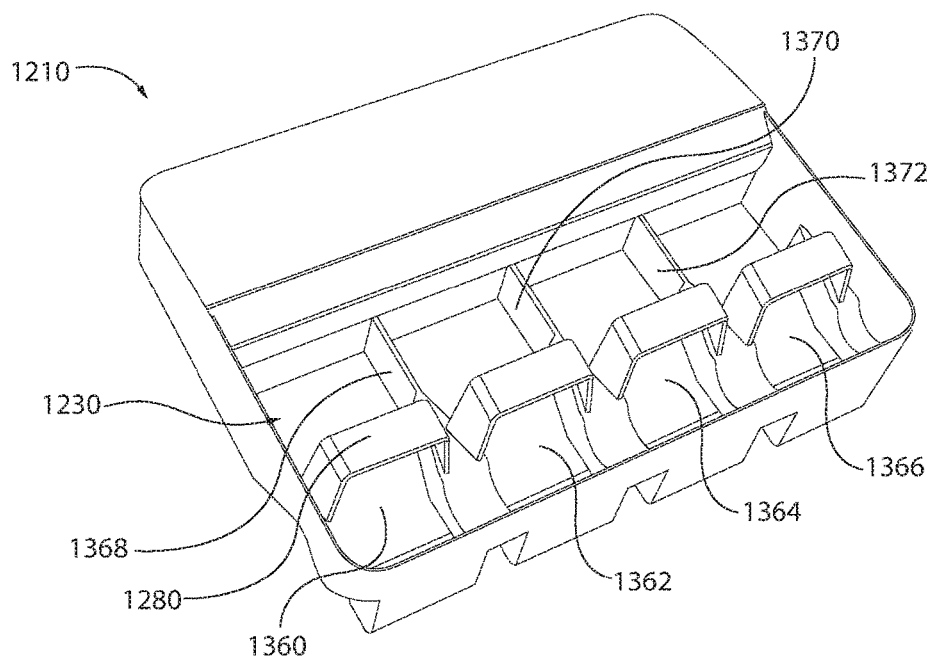
FIG. 33 is a perspective view of the reusable tie down storage case of FIG. 32 in a closed position without tie down assemblies.
Figure 34:
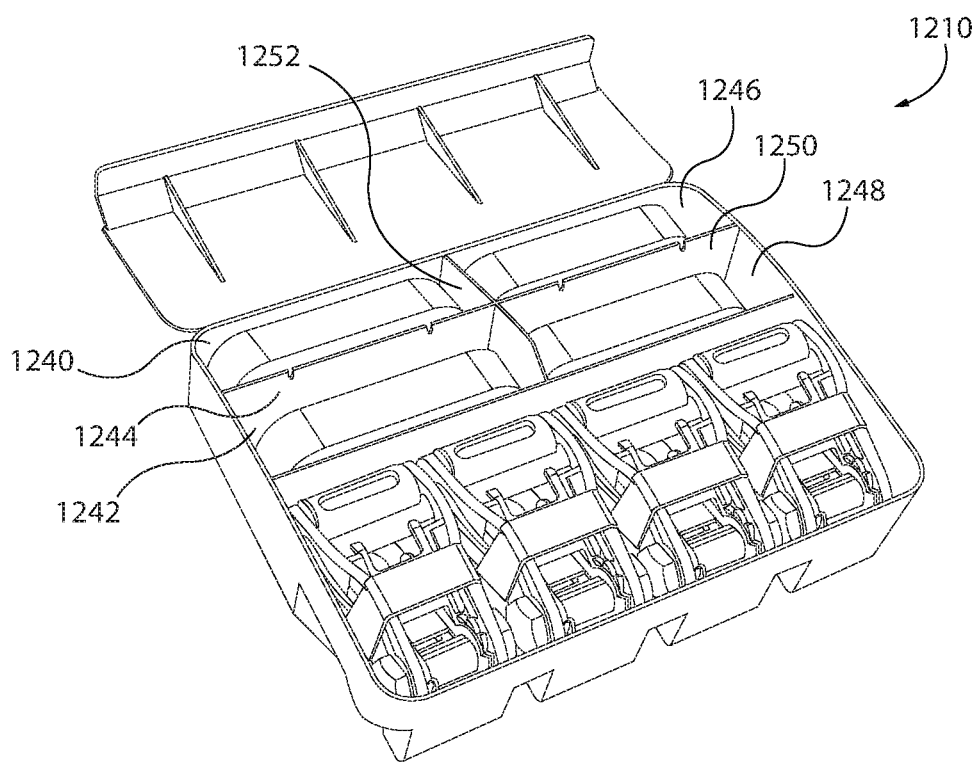
FIG. 34 is a perspective view of a further exemplary reusable tie down storage case in an open position with tie down assemblies.
Figure 35:
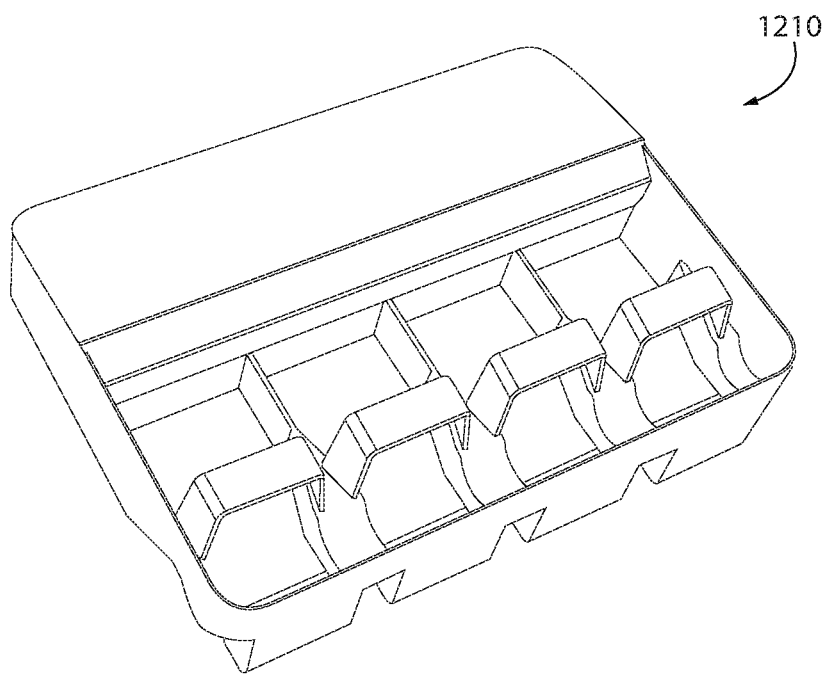
FIG. 35 is a perspective view of the reusable tie down storage case of FIG. 34 in a closed position without tie down assemblies.

FIG. 32 shows the compartments 1240, 1242, 1246, and 1248 in a side by side arrangement, whereas FIG. 34 shows the compartments 1240 and 1246 side by side and above compartments 1242 and 1248

Figure 36:
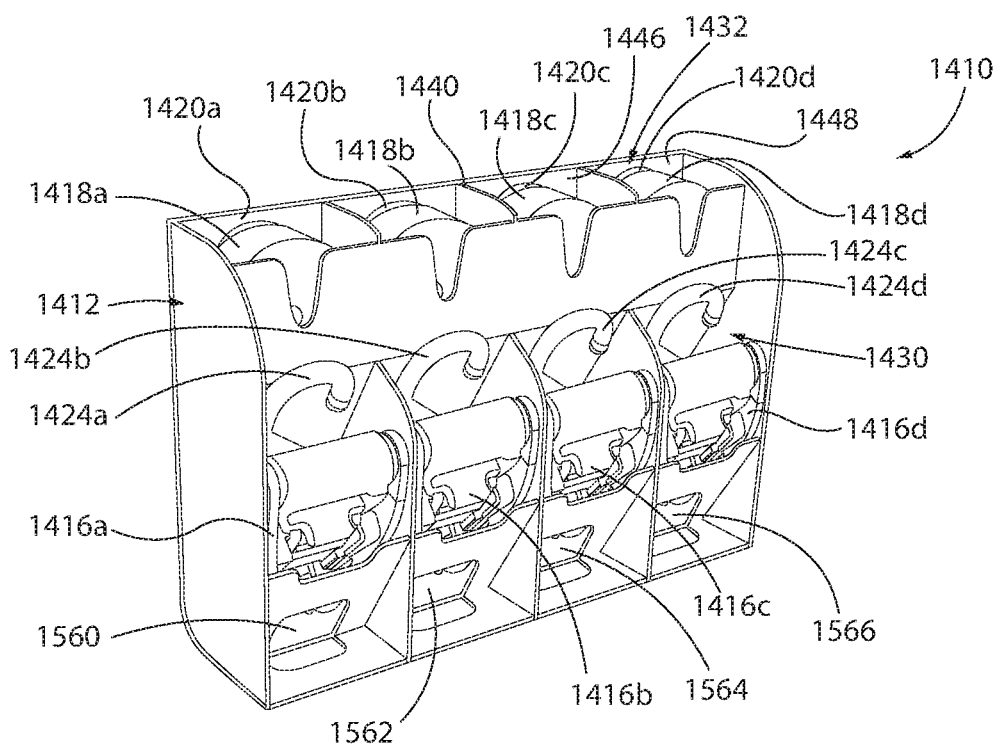
FIG. 36 is a perspective view of another exemplary reusable tie down storage case with tie down assemblies.

Turning now to FIG. 36, an exemplary embodiment of the ratchet storage case is shown at 1410. The ratchet storage case 1410 is substantially the same as the above-referenced ratchet storage case 1210, and consequently the same reference numerals but indexed by 200 are used to denote structures corresponding to similar structures in the cases. In addition, the foregoing description of the ratchet storage case 1210 is equally applicable to the ratchet storage case 1410 except as noted below.

The storage case includes a housing 1412 for storing and displaying a plurality of tie down assemblies. Each tie down assembly includes a ratchet 1416a-1416d having a first strap 1418a-1418d with a hook 1420a-1420d and a second strap (not shown) with a hook 1424a-1424d. The housing 1412 has a first space 1430 or tie down storage area for receiving the ratchets 1416a-1416d, and a second space 1432 or strap storage area for receiving the straps 1418a-1418d.

The first space 1430 is divided into first, second, third, and fourth compartments 1560, 1562, 1564, 1566 forming pockets, and the second space 1432 is divided into first, second, third, and fourth compartments 1440, 1442, 1446, and 1448 forming pockets. The compartments 1560, 1562, 1564, and 1566 house the ratchets 1416a-1416d and hooks 1424a-1424d respectively and the compartments 1440, 1442, 1446, and 1448 house the straps 1418a-1418d and hooks 1420a-1420d.

Figure 39:
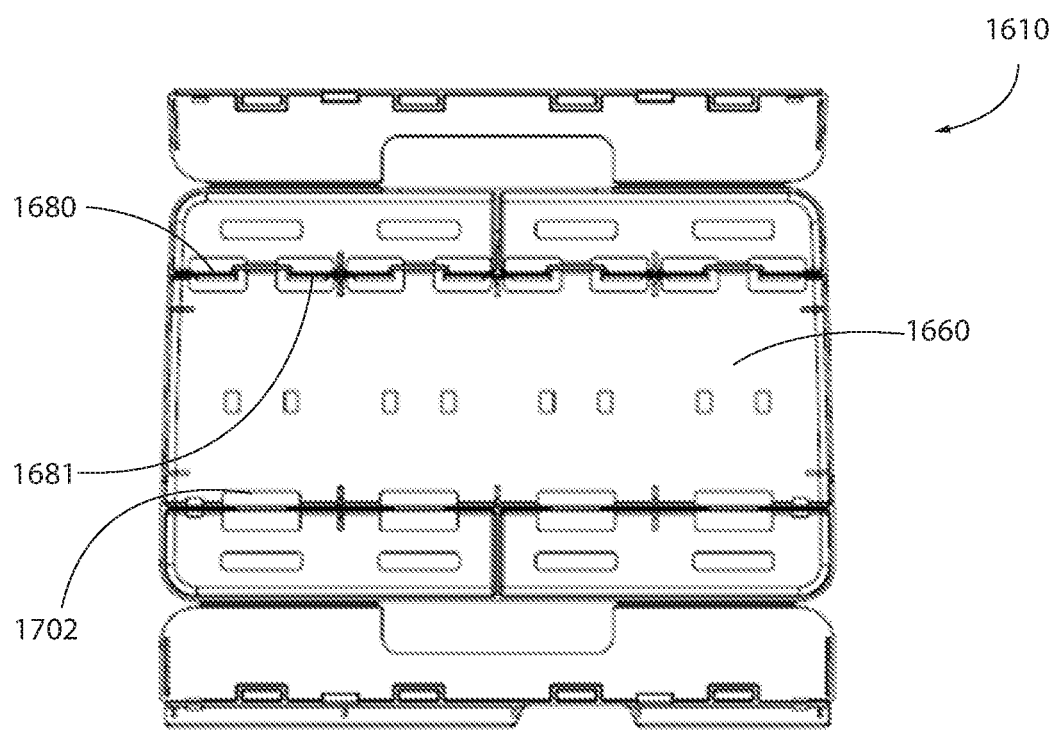
FIG. 39 is a front view of yet another exemplary reusable tie down storage case in an open position without tie down assemblies.
Figure 40:
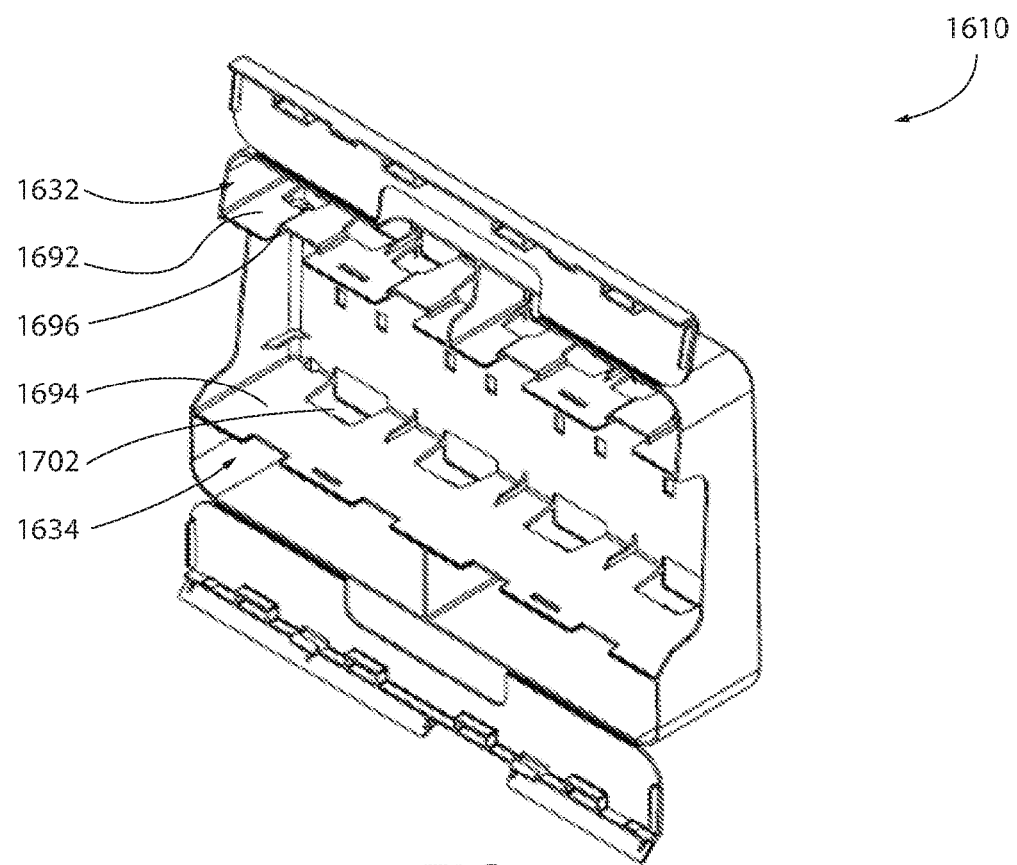
FIG. 40 is a perspective view of the reusable tie down storage case of FIG. 39.
Figure 41:
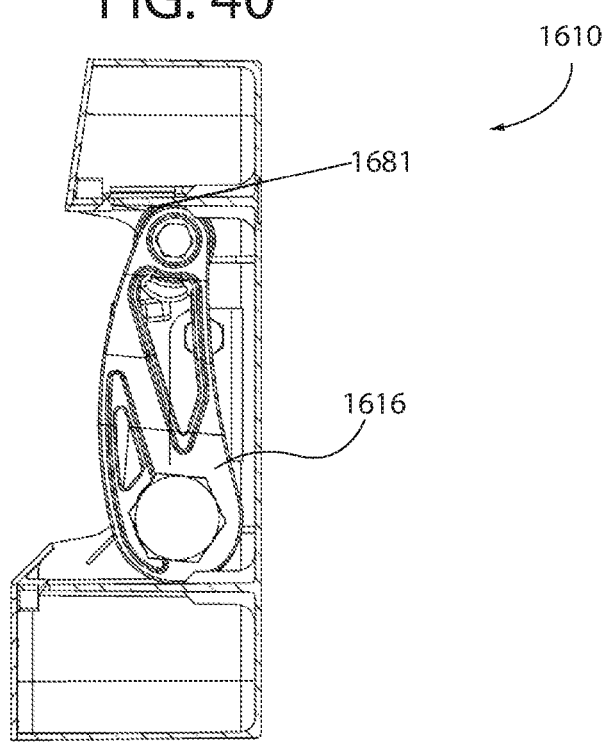
FIG. 41 is a cross-sectional view of the reusable tie down storage case of FIG. 39 in a closed position with a tie down assembly.
Figure 42:
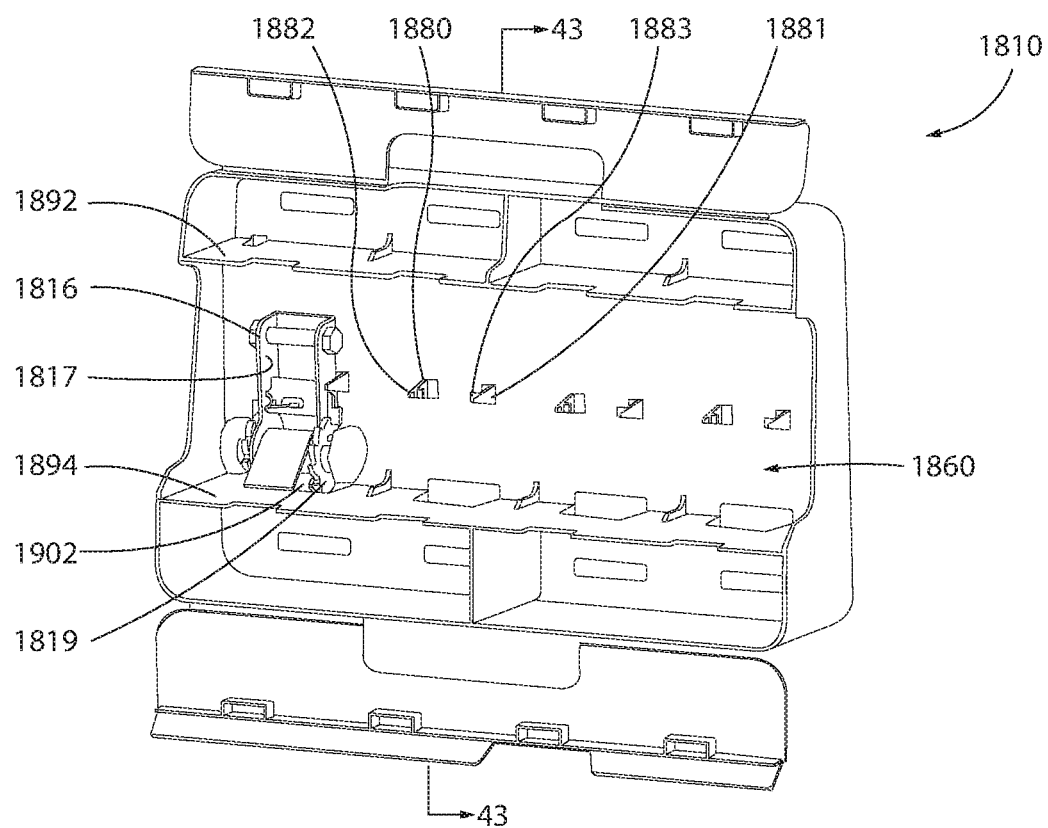
FIG. 42 is a perspective view of a further exemplary reusable tie down storage case in an open position with a tie down assembly.

Turning now to FIGS. 39-41, an exemplary embodiment of the ratchet storage case is shown at 1610. The ratchet storage case 1610 is substantially the same as the above-referenced ratchet storage case 10, and consequently the same reference numerals but indexed by 1600 are used to denote structures corresponding to similar structures in the cases. In addition, the foregoing description of the ratchet storage case 10 is equally applicable to the ratchet storage case 1610 except as noted below.

Projecting from the first inner wall 1692 is a plurality of pairs of tabs or wedges 1680 and 1681 for securing the ratchets 1616. The tabs 1680 and 1681 engage the handle of the respective ratchet 1616 and urge the handle towards the bottom portion 1660. Each pair of tabs 1680 and 1681 is spaced from one another in the first direction to allow the straps to pass through the slots 1696 into the second storage area 1632. The openings 1702 are provided in the second inner wall 1694 to assist in retention of the ratchets 1616, and slots 1696 are provided in the second inner wall 1694 to allow the straps to pass into the third storage area 1634. The ratchets 1616 are positioned in the case 1610 in the same orientation as one another.

Turning now to FIGS. 42-46, an exemplary embodiment of the ratchet storage case is shown at 1810. The ratchet storage case 1810 is substantially the same as the above-referenced ratchet storage case 10, and consequently the same reference numerals but indexed by 1800 are used to denote structures corresponding to similar structures in the cases. In addition, the foregoing description of the ratchet storage case 10 is equally applicable to the ratchet storage case 1810 except as noted below.

Projecting from the bottom portion 1860 are a plurality of pairs of tabs 1880 and 1881 with catches 1882 and 1883 for securing the ratchets 1816 (a portion of the ratchet 1816 is shown). The catches 1882 and 1883 engage shoes 1817 of the ratchets 1816 to capture the ratchets. The openings 1902 are provided in the second inner wall 1894 to receive one or more teeth 1819 of the ratchets to assist in retention of the ratchets 1816. The ratchets 1814 are positioned in the case 1810 in the same orientation as one another.

Figure 43:
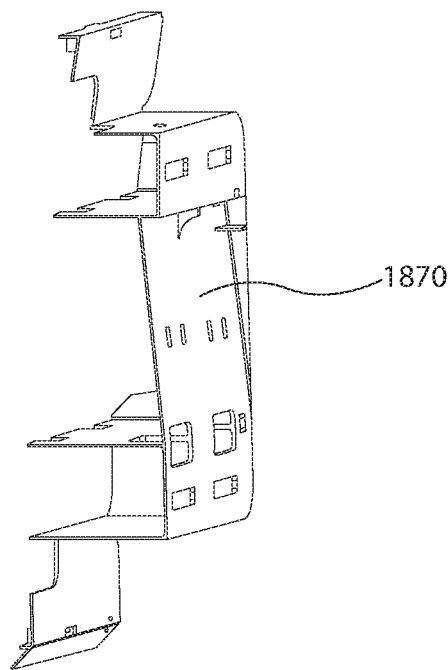
FIG. 43 is a cross-section view of the reusable tie down storage case of FIG. 42 taken about line 43-43.
Figure 44:
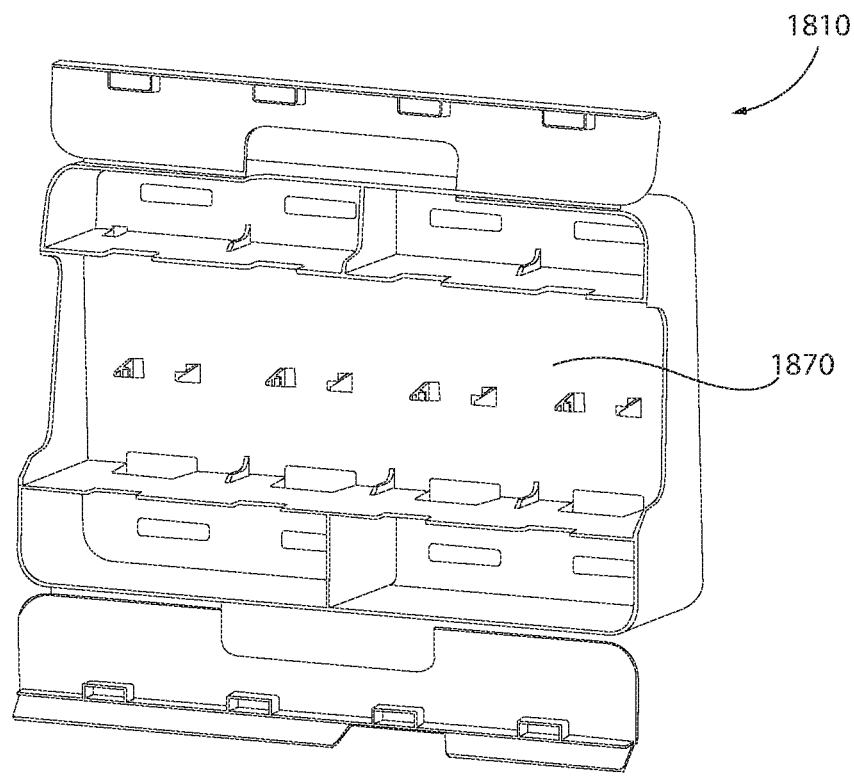
FIG. 44 is a perspective view of another exemplary reusable tie down storage case in an open position.
Figure 45:
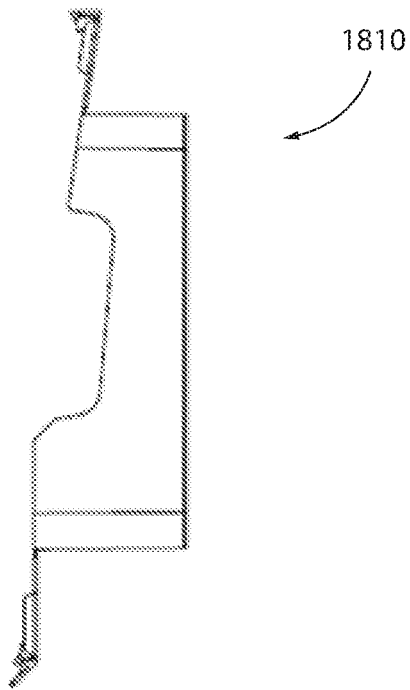
FIG. 45 is a side view of the reusable tie down storage case of FIG. 44.

As shown in FIG. 43, the first planar portion 1870 of the bottom portion 1860 may be angled, whereas the first planar portion 1870 is not angled in FIGS. 44 and 45.

Figure 46:
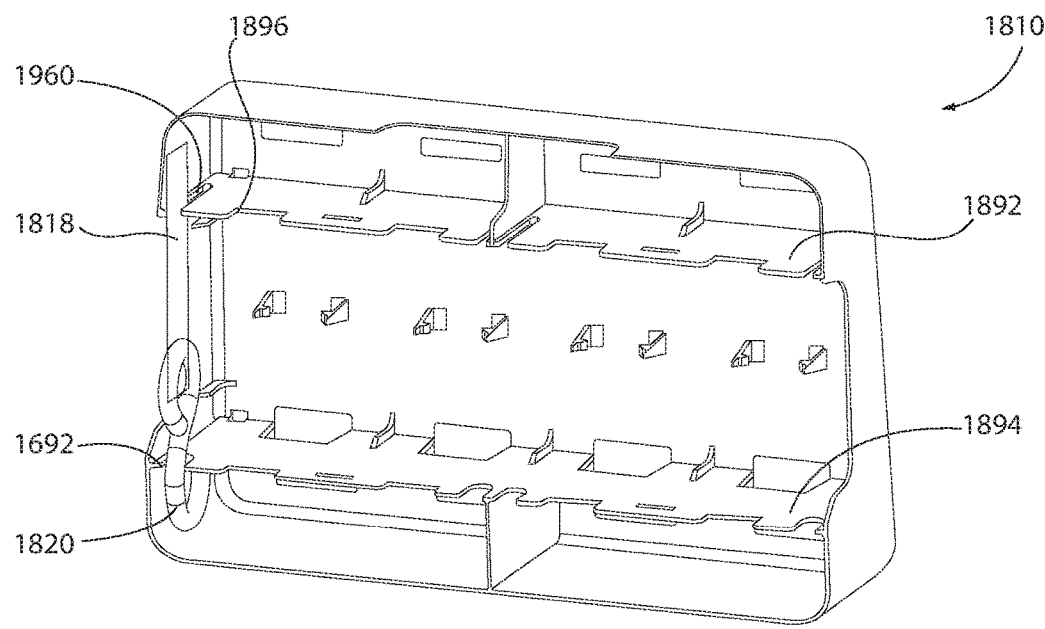
FIG. 46 is a perspective view of yet another exemplary reusable tie down storage case.

As shown in FIG. 46, the strap 1818 is fed through the slot 1896 with its widest section facing upward. The strap 1818 is then twisted ninety degrees and fed through slot 1960 in the first inner wall 1892 with its thinnest section facing upward. The hook 1820 is then placed in a hook groove 1962. It will be appreciated that a slot 1960 and hook groove 1962 may be provided for each tie down assembly and that flaps may be provided.

Figure 47:
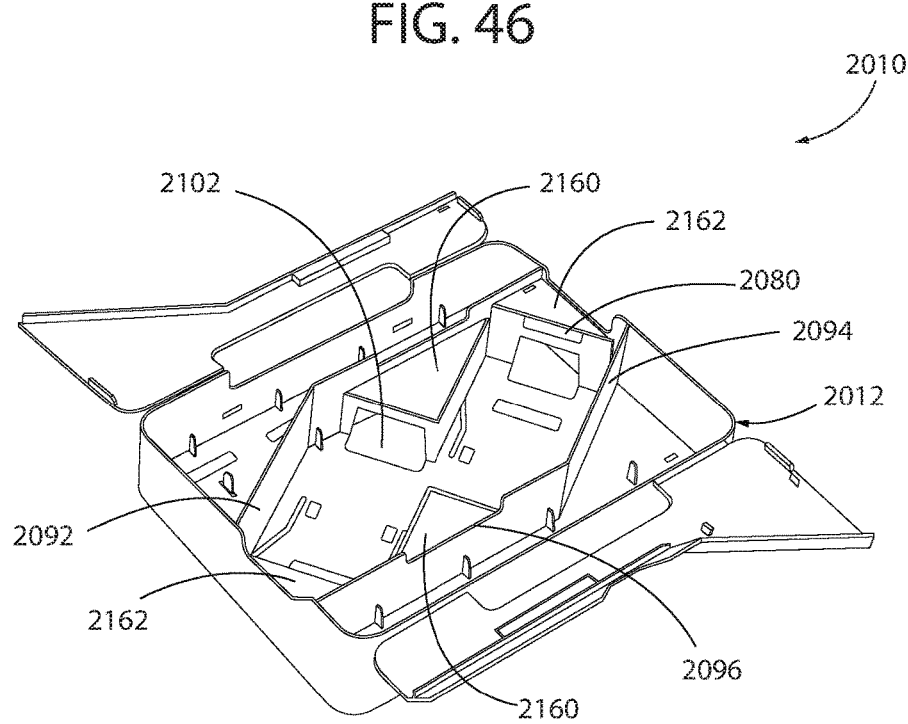
FIG. 47 is a perspective view of still another exemplary reusable tie down storage case in an open position without tie down assemblies.
Figure 48:
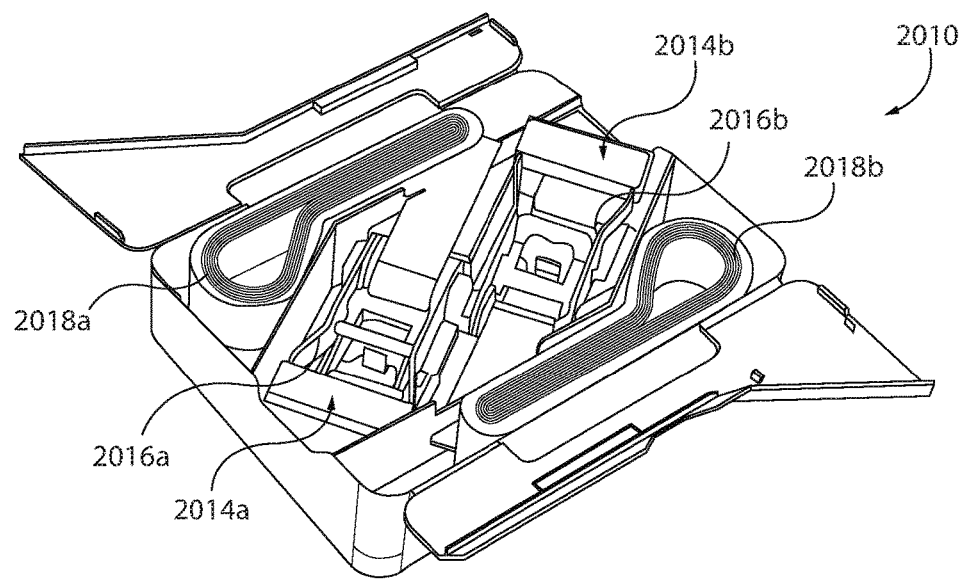
FIG. 48 is a perspective view of the reusable tie down storage case of FIG. 47 with tie down assemblies.
Figure 49:
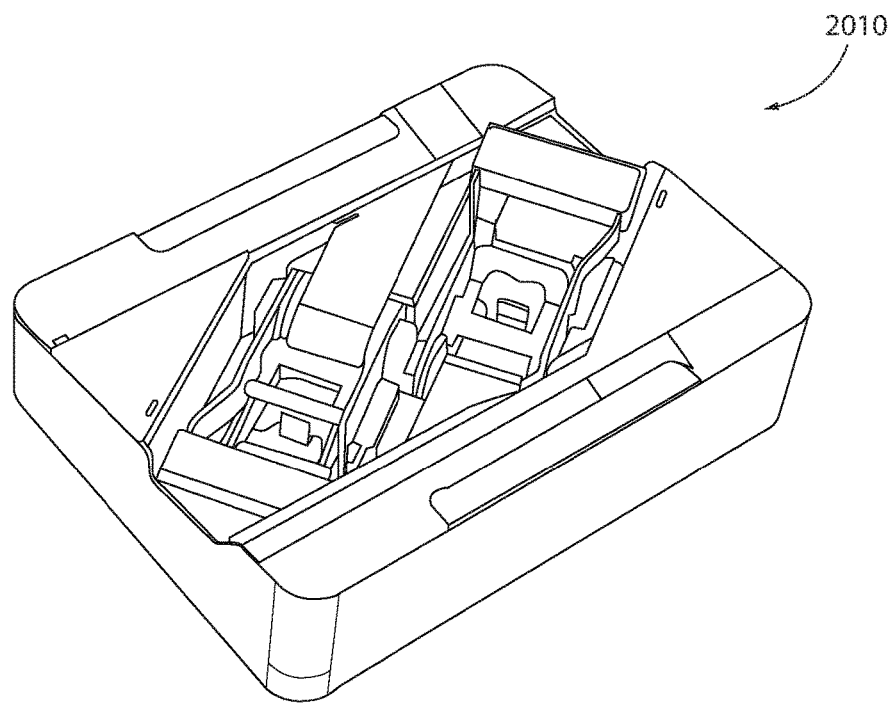
FIG. 49 is a perspective view of the reusable tie down storage case of FIG. 48 in the closed position.

Turning now to FIGS. 47-49, an exemplary embodiment of the ratchet storage case is shown at 2010. The ratchet storage case 2010 is substantially the same as the above-referenced ratchet storage case 10, and consequently the same reference numerals but indexed by 2000 are used to denote structures corresponding to similar structures in the cases. In addition, the foregoing description of the ratchet storage case 10 is equally applicable to the ratchet storage case 2010 except as noted below.

The ratchets 2016a and 2016b of the tie down assemblies 2014a and 2014b are angled and oppositely oriented to minimize a height of the case 2010. Extending from the first and second inner walls 2092 and 2094 of the housing 2012 are first and second substantially triangular wall portions 2160 and 2162 having an opening 2102 and a tab 2080 respectively for securing the ratchets 2014a and 2014b. The triangular wall portion 2160 of the first inner wall 2092 includes the opening 2102 for the first ratchet 2016a and the triangular wall portion 2162 of the first inner wall 2092 includes the tab 2080 for the second ratchet 2014b. A slot 2096 is provided in each inner wall 2092 and 2094 for the straps 2018a and 2018b.

Although certain embodiments have been shown and described, it is understood that equivalents and modifications falling within the scope of the appended claims will occur to others who are skilled in the art upon the reading and understanding of this specification.

What is claimed is:

1. A reusable tie down storage case including:
   a housing having a bottom portion, side walls and end walls projecting from the bottom portion to define a cavity, and first and second inner walls parallel to one another and to the end walls, the cavity having a first space for receiving one or more tie downs, a second space for receiving one or more straps of the tie downs, and a third space for receiving one or more straps of the tie downs;
   at least one deflectable tab in the first space, the tab having a catch for engaging one of the one or more tie downs; and
   a flap connected to one of the end walls and movable between a first position to close the second space and a second position to allow access to the second space,
   wherein the first and second inner walls, the bottom portion, and the side walls form with one another the first space,
   wherein the first inner wall, the bottom portion, the side walls, and one of the end walls form with one another the second space, and
   wherein the second inner wall, the bottom portion, and the side walls, and the other of the end walls form with one another the third space, and
   wherein the first and second inner walls each include a slot for one of the straps of the tie down to pass from the first space into the second or third space respectively.

2. The reusable tie down storage case according to claim 1, wherein the at least one deflectable tab projects from the bottom portion in the first space.

3. The reusable tie down storage case according to claim 1, wherein the flap includes one or more tabs each having a catch for engaging a respective slot to hold the flap in the first position.

4. The reusable tie down storage case according to claim 1, wherein the flap is connected to one of the end walls by a living hinge.

5. The reusable tie down storage case according to claim 1, wherein the flap includes one or more projections for holding the one or more straps and for reducing shifting of the flap.

6. The reusable tie down storage case according to claim 1, wherein the flap includes a pair of side projections on opposite sides of the flap that serve as a stop to reduce shifting.

7. The reusable tie down storage case according to claim 1, wherein the second and third spaces are on opposite ends of the first space.

8. The reusable tie down storage case according to claim 1, further including another flap movable between a first position to close the third space and a second position to allow access to the third space.

9. The reusable tie down storage case according to claim 8, wherein the another flap of the third space includes one or more tabs each having a catch for engaging a respective slot to hold the flap in the first position.

10. The reusable tie down storage case according to claim 1, wherein the at least one deflectable tab includes a plurality of deflectable tabs projecting from the bottom portion in the first space, and wherein the plurality of tabs are spaced from one another widthwise in a first direction and height wise in a second direction perpendicular to the first direction to accommodate oppositely oriented tie downs.

11. The reusable tie down storage case according to claim 1, further including a handle for carrying the case, wherein the handle includes one or more channels on an underside of the handle for supporting the case on a hook and for preventing shifting of the case.

12. A reusable tie down assembly including:
a tie down having a first strap and a second strap; and
a reusable tie down storage case including:
  a housing having a bottom portion, and side walls and end walls projecting from the bottom portion to define a cavity, the cavity having a first space for receiving the tie down, a second space for receiving the first strap, and a third space for receiving the second strap, wherein the second and third spaces are on opposite ends of the first space;
  a first flap connected to one of the end walls and movable between a first position to close the second space and a second position to allow access to the second space; and
  a second flap connected to the other of the end walls and movable between a first position to close the third space and a second position to allow access to the third space.

13. The reusable tie down storage case according to claim 12, further including a first deflectable tab projecting from the bottom portion in the first space, the first deflectable tab having a catch for engaging the tie down to secure the tie down in the storage case.

14. The reusable tie down assembly according to claim 13, further including a second tie down having a first strap and a second strap a second deflectable tab having a catch and projecting from the bottom portion of the first space to secure the second tie down in the storage case, wherein the first and second deflectable tabs are spaced from one another widthwise in a first direction and height wise in a second direction perpendicular to the first direction to oppositely orient the tie downs.

15. The reusable tie down assembly according to claim 14, wherein the second space receives the first strap of the first tie down and the second strap of the second tie down, and the third space receives the first strap of the second tie down and the second strap of the first tie down.

16. The reusable tie down storage case according to claim 12, wherein the first and second flaps each include one or more tabs, and wherein each tab has a catch for engaging a respective slot to hold the respective flap in the respective first position.

17. The reusable tie down storage case according to claim 12, wherein the first and second flaps are each connected to one of the end walls by a living hinge.

18. The reusable tie down storage case according to claim 12, wherein the first and second flaps each include one or more projections for holding the first and second straps respectively and for reducing shifting of the respective flap.

19. The reusable tie down storage case according to claim 12, wherein the first and second flaps each include a pair of side projections on opposite sides of the respective flap that serve as a stop to reduce shifting.

20. The reusable tie down storage case according to claim 12, further including a handle for carrying the case, wherein the handle includes one or more channels on an underside of the handle for supporting the case on a hook and for preventing shifting of the case.

\* \* \* \* \*